May 14, 1935. C. E. IVES 2,001,325
HYDRAULIC TRANSMISSION
Filed April 9, 1932 6 Sheets-Sheet 4
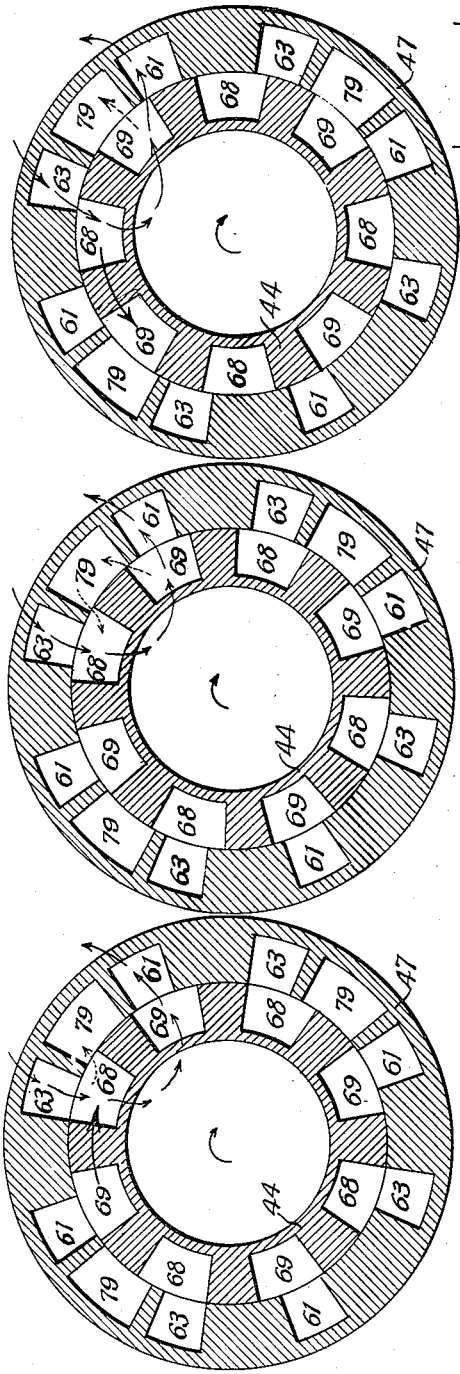
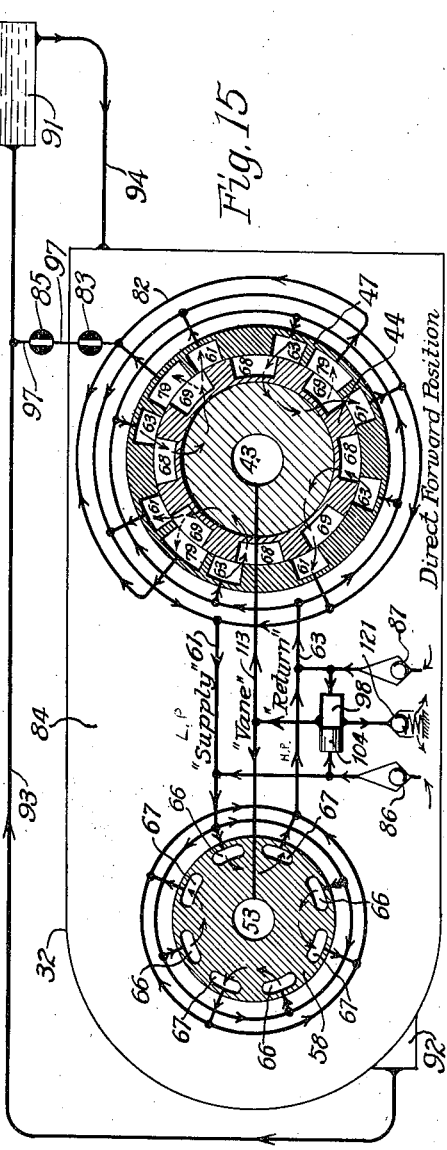
Inventor:
Clifford E. Ives
By Mueller & McLaughlin
Attys.

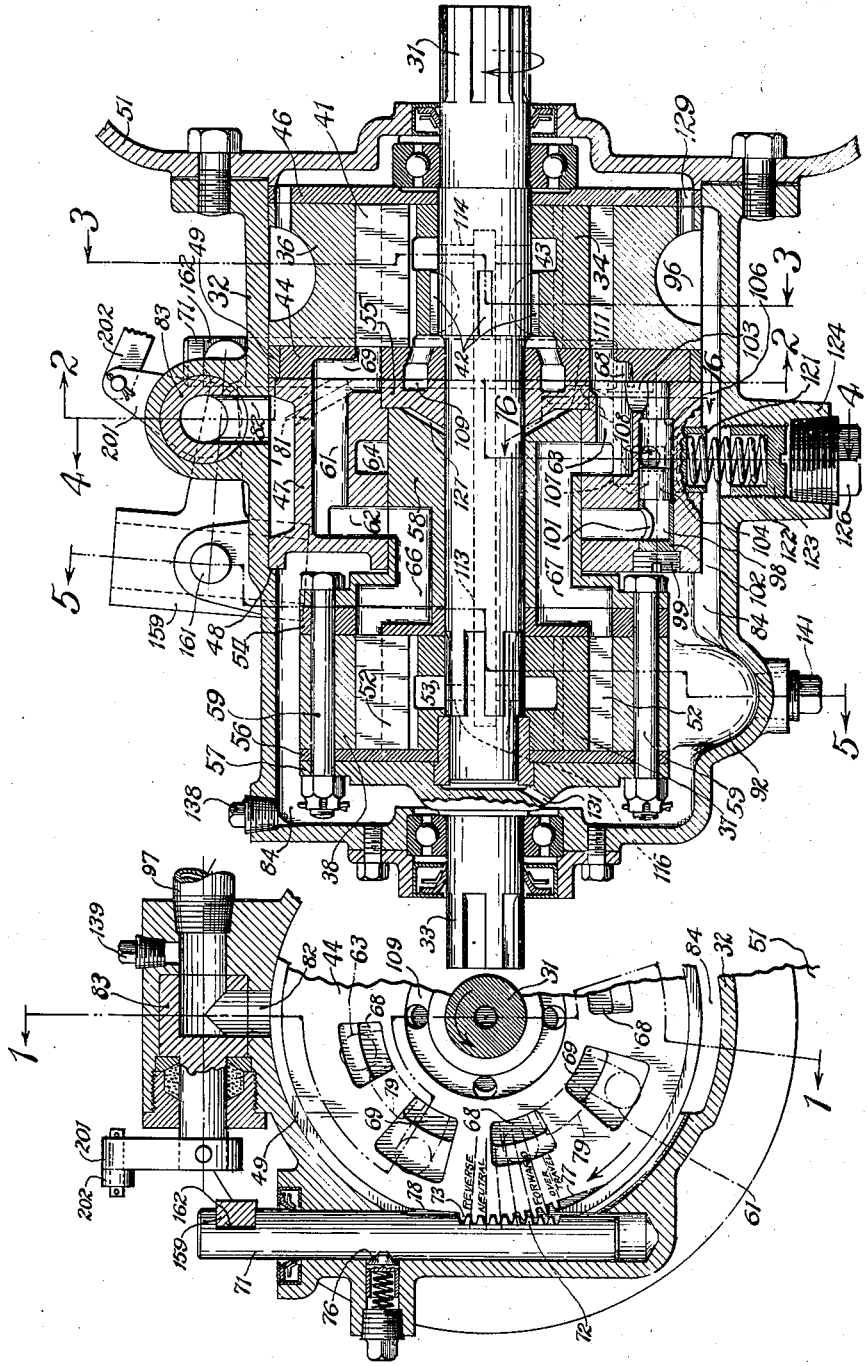

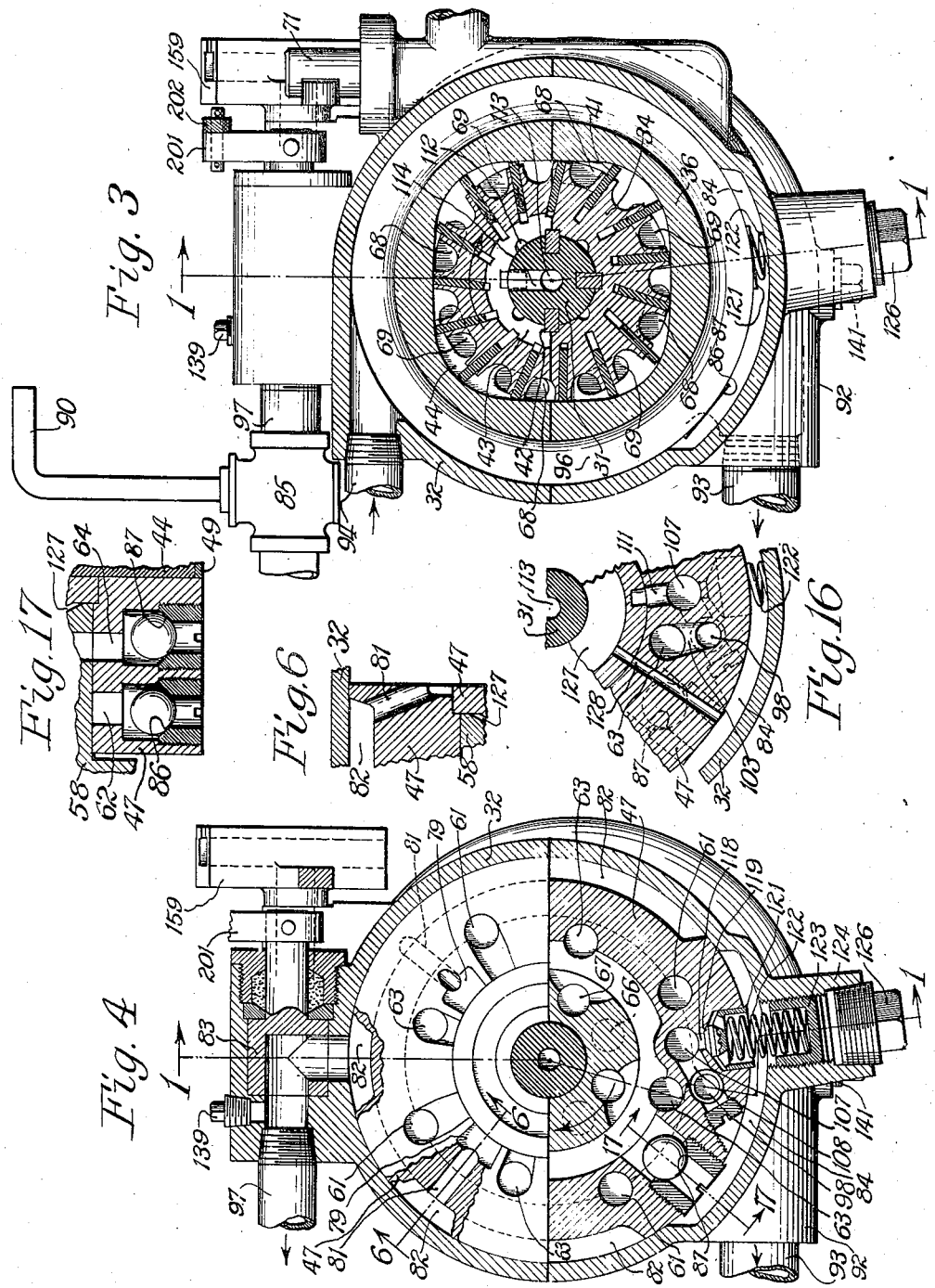

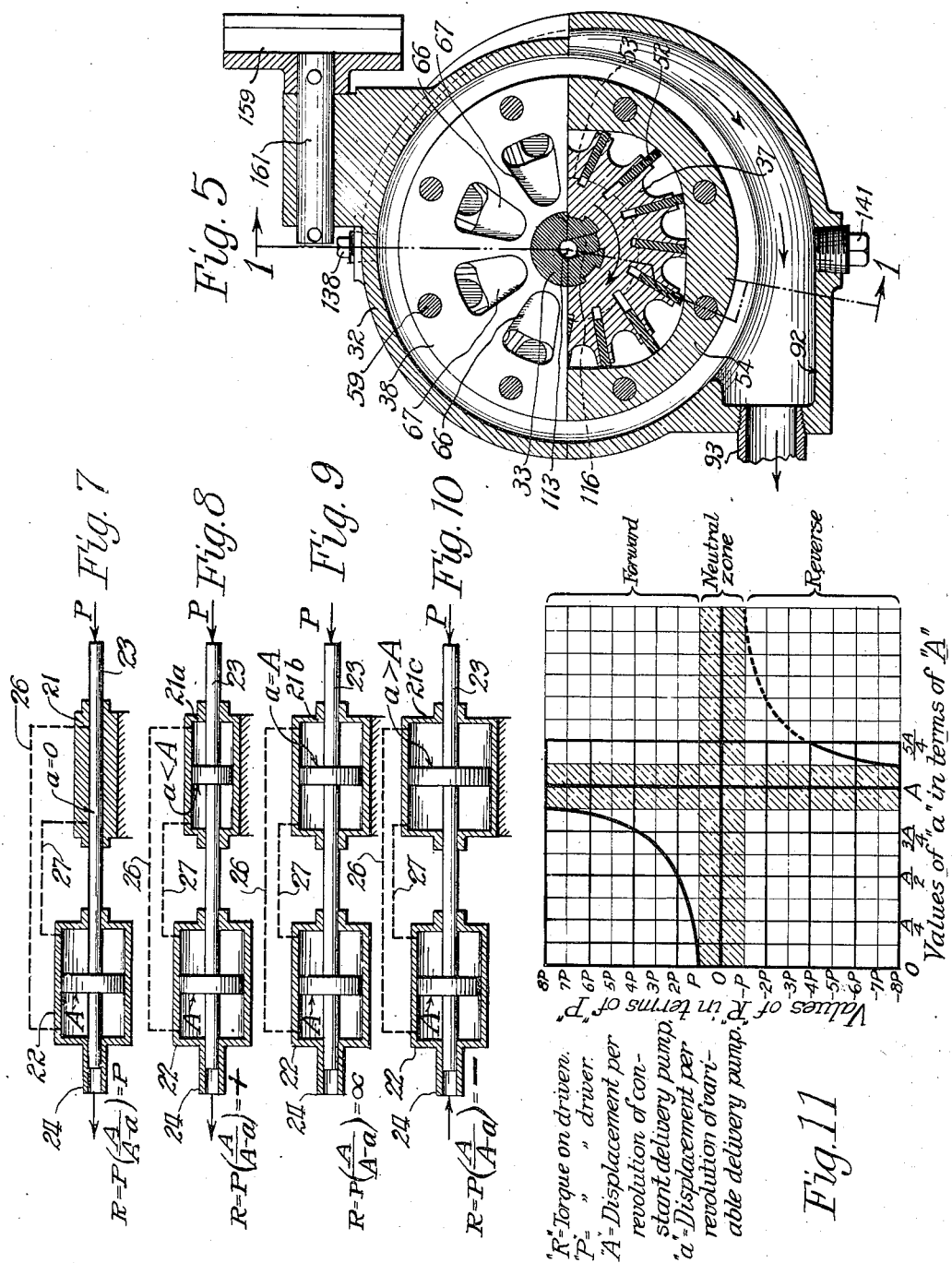

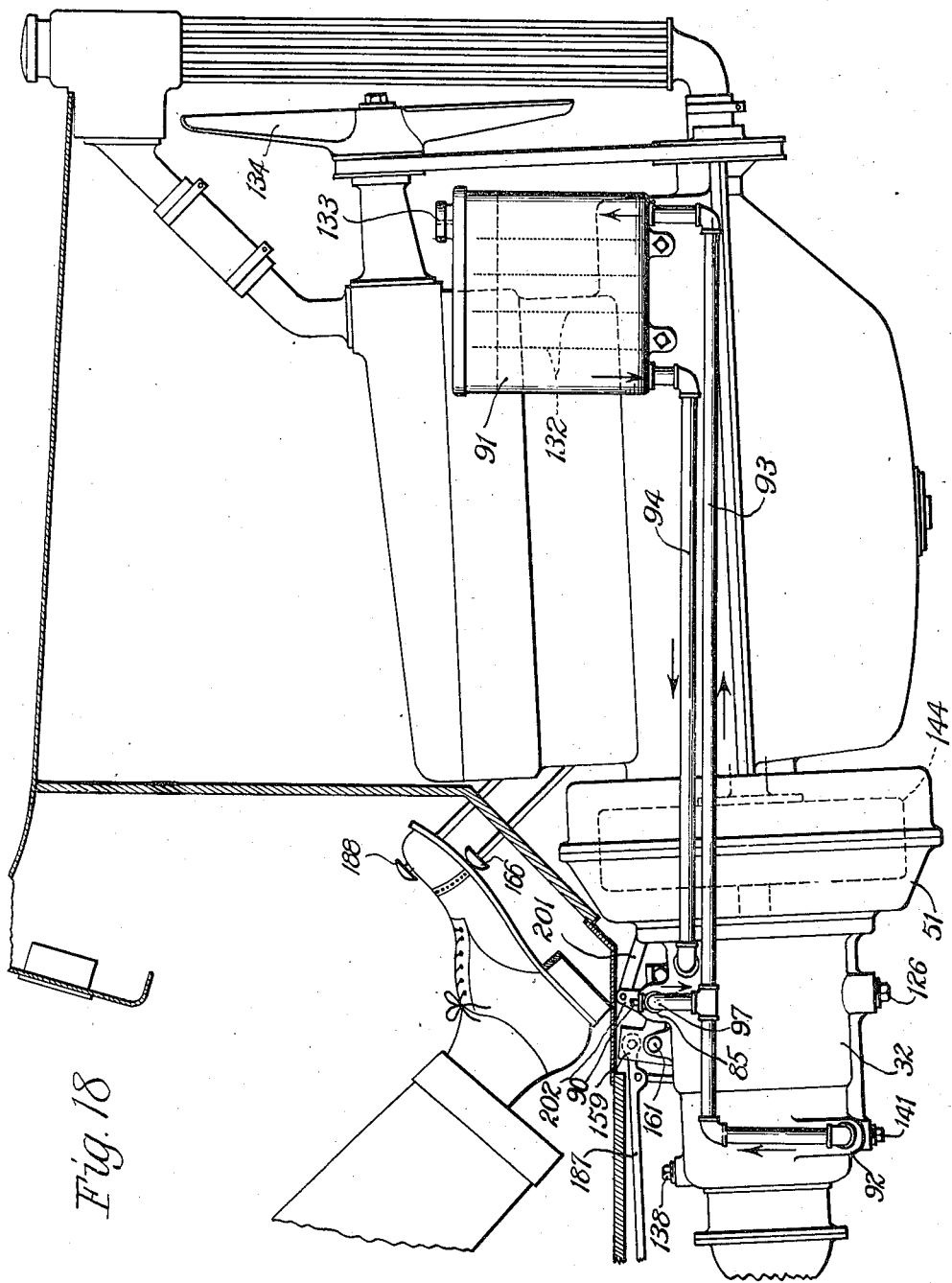

May 14, 1935.  C. E. IVES  2,001,325
HYDRAULIC TRANSMISSION
Filed April 9, 1932  6 Sheets-Sheet 6

Inventor:
Clifford E. Ives
By Mueller & McLaughlin
Attys.

Patented May 14, 1935

2,001,325

UNITED STATES PATENT OFFICE 2,001,325

HYDRAULIC TRANSMISSION

Clifford E. Ives, Wilmette, Ill.

Application April 9, 1932, Serial No. 604,163

43 Claims. (Cl. 60—19)

My invention relates in general to variable speed transmission mechanisms. It relates more in particular to a hydraulic variable speed transmission mechanism adapted particularly for use on an automobile for transmitting the movement of the automobile engine crank shaft to the propeller shaft.

In automobile development work, particularly in the portion thereof that relates to the transmission of power from the engine to the wheels, there has been a gradual tendency in several directions, all more or less having to do with automatic clutch control, automatic gear shift control, free-wheeling and the like. One of the developments looked to to produce improved operating characteristics along the lines suggested is in the use of hydraulic transmission mechanisms.

It has been understood for some considerable length of time that, with a hydraulic drive properly controlled, it might be possible to do away with the ordinary friction plate clutch entirely. Consequently, there has been intensive development and experimentation along this line, as well as along other lines, to produce improved driving and transmission characteristics in automobiles.

Heretofore, so-called hydraulic transmission mechanisms have not been satisfactory. The principles employed have made it impossible to secure the simple and direct control, theoretically possible in a hydraulic transmission, without at the same time introducing problems in oil heating, oil leakage, and the like. Moreover, very often instead of simplifying the control of an automobile, the proposed hydraulic transmission has so complicated the work of the driver as to make it impossible, or at least impractical, to place the hydraulic transmission on automobiles intended for operation by the rank and file of drivers. Care and upkeep of standard types of mechanical transmissions and clutches have become so simple that very little, if any, attention need be given to these devices by ordinary drivers. Moreover, the devices, with only ordinary attention, will usually last the life of the automobile. No hydraulic transmission is of any practical value unless it can be employed with no more care than now expended on the corresponding mechanical transmission, and unless it is capable of lasting practically the life of the car with only ordinary care.

Exceedingly high torque ratios are possible with hydraulic drives, and this complicates the actual use of the hydraulic transmission when placed in the hands of the ordinary driver, unless a practical safety means is provided for avoiding injury to the mechanical portions of the mechanism entering into the drive.

The principal object of the present invention is to transmit power hydraulically at variable speeds from the engine crank shaft to the driving shaft in such a way as to avoid all of the difficulties hereinabove outlined.

Another object is the provision of a hydraulic transmission adapted for use under all conditions without the employment of a separate clutch in the drive train.

Another object is the provision of a hydraulic transmission capable of operating on a so-called "free-wheeling" principle, or in such a way as to use the engine as a brake.

Another object is to obtain greater braking efficiency from the engine than has been possible heretofore.

Another object is the provision of a hydraulic transmission in which the drive is uni-directional from the engine to the propeller shaft, but which may be adjusted to provide a bi-directional drive.

Another object is the provision of a hydraulic transmission which can be made to operate substantially indefinitely without changing the hydraulic fluid.

Another object is the provision of a hydraulic transmission of high efficiency, in which substantially all of the power input is transmitted to the driven shaft whereby there is a minimum loss of power manifesting itself in heating of the oil.

Another object is the provision of a hydraulic transmission operable in a full range of speeds from substantially infinite gear ratio to an overdrive ratio, if desired.

Another object is the provision of a transmission mechanism in which the reverse drive includes a continuous range of speeds from substantially infinite gear ratio to the maximum speed ratio determined by the limits of the design.

Another object is the provision of a hydraulic transmission operable in both direct and reverse by a single control means.

Another object is the provision of a hydraulic transmission operable by a single control lever having a neutral position and operating in one direction to control the range of speeds forward from neutral to full forward drive and operating in the opposite direction to produce a full range of reverse speeds from neutral to full reverse drive.

Another object is the provision of a hydraulic transmission operable to produce "free-wheeling" and in which the driver can shift from "free-wheeling" to conventional direct drive or back at any time.

Another object is the provision of a hydraulic transmission device having a relatively wide neutral zone between the forward and reverse drive positions.

Another object is the provision of a hydraulic transmission having a complete range of speeds in both forward and reverse.

Another object is the provision of a hydraulic transmission having safety means for preventing the application of too great a load upon the mechanical portions of the automobile.

Another object is the provision of improved means in a hydraulic transmission for removing air and/or other foreign matter from the hydraulic fluid.

Another object is the provision of improved means in a hydraulic transmission for maintaining the hydraulic fluid at a relatively low temperature.

Another object is the provision of a hydraulic transmission provided with automatic means for decreasing the torque ratio and changing the relative speed of rotation between the crank shaft and the propeller shaft.

Another object is to control the rate at which the automatic speed change takes place, whereby the gear ratio may be brought up to direct drive at any pre-determined automobile speed.

Another object is the provision of a hydraulic transmission mechanism operated on the "free-wheeling" principle, but adapted to form a bi-directional drive when the automobile brake is applied, whereby the engine functions as a brake during the braking of the car.

Another object is the provision of a hydraulic transmission wherein there is substantially no oil movement in direct drive.

Another object is the provision of a hydraulic transmission adapted to change the drive ratio in accordance with the car's speed when operating in both forward and reverse directions.

Another object is the provision of a hydraulic transmission and means for changing the drive ratio thereof automatically in both forward and reverse.

Other objects and features of the invention will be apparent from a consideration of the following detailed description taken with the accompanying drawings, wherein Fig. 1 is a longitudinal, somewhat irregular, sectional view taken along the line 1—1 of Fig. 2. (A portion of Fig. 1 is taken along the line 1—1 of Figs. 3, 4, and 5, in order to better show the relative positions of the parts);

Fig. 2 is a fragmentary transverse sectional view taken along the line 2—2 of Fig. 1;

Fig. 3 is an irregular sectional view taken along the line 3—3 of Fig. 1;

Fig. 4 is an irregular sectional view taken along the line 4—4 of Fig. 1, looking in the direction of the arrows, a portion of this view being taken along the same line as Fig. 2, but looking in the opposite direction;

Fig. 5 is an irregular transverse sectional view taken along the line 5—5 of Fig. 1;

Fig. 6 is a fragmentary sectional view taken on the line 6—6 of Fig. 4, and showing the location of one of the oil ports;

Figure 19:
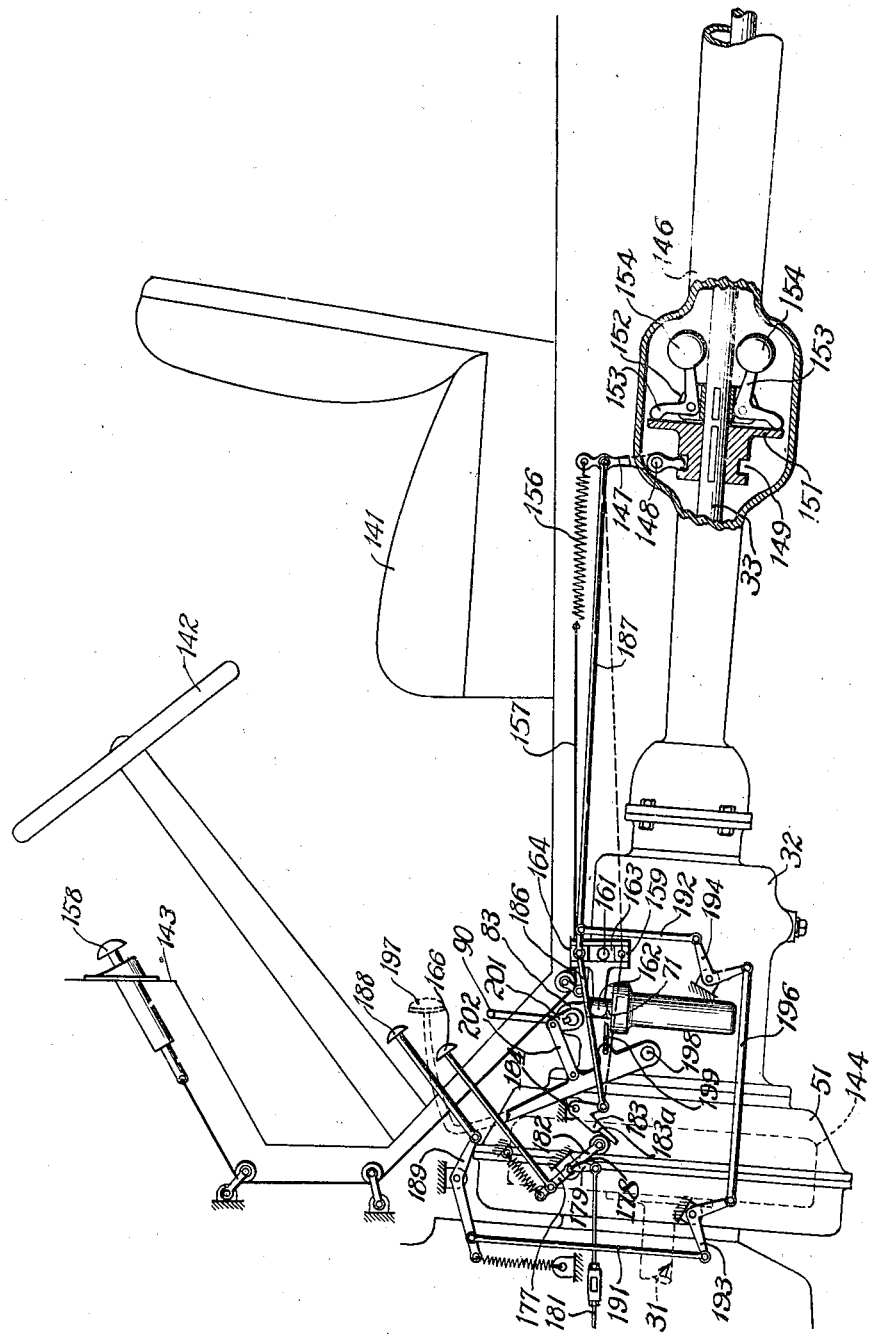

Figs. 7 to 10, inclusive, are diagrammatical illustrations of the hydraulic principle employed in my transmission device;

Fig. 11 is a mathematical chart showing torque ratios for various positions of the control means in both forward and reverse;

Figs. 12, 13 and 14 are somewhat diagrammatical views of the reverse, neutral and forward positions, respectively, of the ported means of control;

Fig. 15 is a hydraulic flow diagram of the system;

Fig. 16 is a fragmentary cross section taken along the line 16—16 of Fig. 1;

Fig. 17 is a fragmentary sectional view taken along the line 17—17 of Fig. 4;

Fig. 18 is an elevational view showing the cooling and air separating tank, the free-wheeling control and some of the pipe connections; and Fig. 19 is an elevational view showing features of the device, including modifications in the control therefor.

In carrying out my invention, I employ a variable capacity pump operated by the power input shaft and a fixed capacity pump controlled by the fluid supplied to it by the variable capacity pump. In its simplest form, the fixed capacity pump is of the rotary vane type, having a vane rotor driven directly by the power input shaft and an outer casing connected directly to the power output shaft. Control of the power output shaft is accomplished by varying the capacity of the variable capacity pump. When the capacity of the variable pump is adjusted to the same capacity as the fixed pump, the rotor of the fixed capacity pump revolves within its casing at the same relative speed with respect to the casing as the input shaft speed. In other words, the two rotors driven together have the same speed with respect to their respective casings, with the result that the power ouput shaft connected directly to the casing of the fixed capacity pump is stationary and the torque ratio between the input shaft and the output shaft is theoretically infinite. By decreasing the output of the variable capacity pump, the relative speed of the rotor of the fixed capacity pump decreases and movement is imparted to its casing and concomitantly to the power output shaft connected to it. It will be understood that by the terms "fixed capacity pump" and "variable capacity pump" I mean the capacity per revolution, and the capacity per revolution is determined not by the speed of the rotor but by the relative speed in each instance between the rotor and casing. The variable capacity pump casing is stationary in the present embodiment of the invention and so its capacity per unit of time is determined directly by the number of revolutions of the rotor. The fixed capacity pump, however, having a rotatably mounted casing, has a fixed capacity per revolution with respect to the rotor and casing, but its capacity per unit of time is determined by the capacity to which the variable capacity pump is set. Its capacity being fixed per revolution, and the actual supply of hydraulic fluid being limited, the casing is caused to turn with the rotor when the supply of hydraulic fluid is less than the actual capacity of the pump, with the resultant movement of the output shaft. When the variable capacity pump is set to zero capacity, the casing of the fixed capacity pump will turn substantially directly with its rotor, so that at direct drive the rotor and casing of the fixed capacity pump rotate as a unit and there is substantially no movement of hydraulic fluid therethrough. Conversely, when the capacity per revolution of the variable capacity pump is set greater than the capacity per revolution of the fixed capacity pump, there will be a necessary greater relative speed between the rotor and casing or stator of the fixed capacity pump. This increased relative speed cannot be translated into increased speed of the rotor, due to the fact that the rotor is directly connected to the input shaft. The result is that the stator is forced to move in a reverse direction and the movement of the output shaft is concomitantly in a reverse direction.

This is briefly the principle around which my present transmission mechanism is developed. In its present form, as hereinabove indicated, it employs a rotary type of pump. When the hydraulic principle employed is understood, however, it will be obvious that the principles may be embodied in any design capable of accomplishing the necessary movement of the hydraulic fluid, and of stabilizing or arresting the movement for the purpose outlined. I prefer, however, the rotary type of pump, such as shown, for reasons which will appear obvious. For a more fundamental understanding of the principles involved, I shall refer briefly to Figs. 7 to 10 inclusive.

Each of Figs. 7 to 10, includes a fixed cylinder 21 and a floating cylinder 22, for convenience the cylinders 21 being differentiated from each other by letters $a$, $b$ and $c$, the cylinder 21 being small and increasing in diameter at 21$a$, 21$b$ and 21$c$, respectively. The cylinders 22 are all of the same size and same capacity. A piston rod 23 extends through each pair of cylinders 21 and 22. In each of the cylinders 22, a piston A is operably attached to the rod 23. The cylinder 21 has no piston, while each of the cylinders 21$a$ to 21$c$ is provided with a piston $a$ secured to the rod and operable therewith. It will be seen that the cylinder 21 has the same inside diameter as the rod 23, so that the capacity thereof is zero. For the purpose of explaining the principles here employed, however, I am assuming a piston $a$ also disposed in the cylinder 21 of zero capacity; in other words, this piston has the same diameter as the rod 23.

For the purposes of analogy, the rod 23 corresponds to the input shaft of my transmission and an extension 24 corresponds to the output shaft. The pistons $a$ and A correspond to the rotors connected directly to the input shaft. The cylinders 21 to 21$c$, inclusive, correspond to the non-rotatable or fixed stator, and the cylinder 22 corresponds to the rotatably or movably mounted stator of the fixed capacity pump connected directly to the power output shaft of the transmission. The ends of the cylinders 21 and 22 are connected by flexible pipes indicated by the dotted lines 26 and 27, these connections being equivalent, for purposes of analogy, to the connections between the two pumps which I employ, as will be made clear as the description progresses.

For the purpose of analyzing the hydraulic principle involved, I assume the application of a pressure P on the rod 23, and the effect of this pressure is measured on the extension 24, and the value thereof indicated by the character R. It will at once be obvious that I am explaining Figs. 7 to 10 in terms of pressure and resistance to pressure. This is done for the purpose of simplicity, it being understood, of course, that P and R could be measured in terms of linear movement.

Now assume the application of a pressure P on the rod 23 in Fig. 7 in the direction indicated by the arrow. The cylinder 21 is of zero displacement and it is impossible for oil to pass in either direction through either the pipe 26 or the pipe 27. The piston A cannot move within the movably supported cylinder 22, and so the pressure applied at P on the rod 23 is transmitted directly to the member 24. It follows, also, of course, that whatever movement is imparted to the rod 23 is also imparted directly to the movable cylinder 22 and the extension 24. This corresponds to direct forward drive.

The value of R is very easily determined by means of a simple algebraic equation, $$R = P\left(\frac{A}{A-a}\right)$$

Supplying the value of $a$ in the equation, (applying zero value to $a$ as in Fig. 7) we have $$R = P\left(\frac{A}{A-o}\right)$$

or R=P.

In Fig. 8, the fixed cylinder has a capacity less than the capacity of the cylinder 22 and $a$ has a smaller area than A. Assume an area of the two pistons of the order of 2 to 1. We substitute in our formula $$R = P\left(\frac{2}{2-1}\right)$$

therefore, R=2P. Translated into terms of transmission drives, this means that with these relative capacities there would be a 2 to 1 torque ratio between the input shaft and the output shaft, or, in other words, that the input shaft would travel at twice the speed of the output shaft.

In Fig. 9, the pistons $a$ and A are the same size, so that, in accordance with the legend at the left of the figure, movement of the rod 23 will not produce any movement of the extension 24 for the reason that when oil ahead of the piston A is displaced, it flows to the cylinder 21$b$ behind the piston $a$, and the oil ahead of piston $a$ and displaced by it flows over to fill up the space behind the piston A. In other words, since the displacement of the two cylinders or pumps is the same, the shaft 23 can be moved in either direction without any movement of the floating cylinder 22. Therefore, there is a theoretical infinite pressure ratio equivalent to an infinite torque ratio between an input and output shaft.

In Fig. 10, the cylinder 21$c$ is larger than the cylinder 22. Applying the formula, we find that R has a minus value, or, in other words, the movement of the cylinder 22 is always in a reverse direction to the movement of the rod 23. The rate of reverse movement is determined entirely by how much the area of piston $a$ is greater than the area of piston A.

From a discussion of these four figures, it is clear that if means are provided for varying the capacity of the piston $a$, any drive characteristic desired may be obtained. In the practical carrying out of my invention, this is the result which I obtain. I shall now refer to the mechanical structure with which my principle is clothed in the present embodiment.

Referring now to Fig. 1, and the sections taken thereon, I employ an input shaft 31 projecting into a casing 32, and an output shaft 33 adapted by hydraulic means, to be described, to receive motion from the shaft 31. The shaft 31 carries a rotor indicated generally by the reference character 34, which is disposed within a stationary housing or stator 36. This shaft at its other end also carries a rotor 37 which turns within a rotatable housing or stator 38 fixed to or having a direct connection to output shaft 33. The rotor 34 and stator 36 hereinafter referred to generally as the variable capacity pump, have a greater maximum or potential capacity than that of the fixed capacity pump, which includes the rotor 37 and the stator 38. Connections are provided between the two pumps whereby, based upon the principle disclosed in Figs. 7 to 10, rotation of the shaft 31 may be made effective to drive the shaft 33 at any range of speeds from zero to direct drive and also in reverse at any gear ratio or torque ratio possible within the limits of a particular design.

Now, consider the construction of the variable capacity pump itself shown particularly in Figs. 1 and 3. The rotor 34 includes a vane block slotted to receive vanes 41. The vane block is secured to the shaft 31 by keys 42 and the inside of the block is provided with a pressure space 43 adapted to carry hydraulic fluid under pressure to assist in holding the vanes downwardly against the stator block 36. These vanes also tend to move out under centrifugal force when the shaft 31 is turning.

In a pump of this character, several different means for varying the capacity may be provided. I employ a control plate 44 provided with a plurality of ports, which will be identified and described more in detail hereinafter, for delivering oil to the pump and receiving the discharge therefrom. As will be seen by a consideration of Fig. 3, the pump is provided with four quadrants, so that in reality it comprises four pumps in one, with four intakes and four outlets. The control plate 44 forms one side of the casing, while a plate 46 forms the opposite side of the casing. In other words, the stator proper includes the stator block 36, the adjustable control plate 44 and the stationary plate 46.

Immediately adjacent the control plate 44, I provide a stationary port housing 47 held between an annular shoulder 48 on the main housing 32 and a spacer 49, one side of the spacer abutting the port housing 47 and the other side abutting the stator block 36. The spacer 49 has the function of providing the needed space for the adjustable control plate 44, so that when a main housing cover 51 is bolted to the housing, all of the stationary parts may be drawn up tightly without wedging the control plate in so as to prevent movement thereof. In this connection, I wish to point out that in a transmission unit of this character, it is desirable to fit everything relatively snugly so as to prevent leaks. It is well understood that oil passing through leaks means a loss of power resulting in the generation of heat which, if sufficiently high, may cause a failure.

Now considering the fixed capacity pump, as appearing more in detail in Fig. 5, this is of the same general character as the variable capacity pump, including vanes 52 disposed in substantially radial slots in the rotor block 37, the rotor block being provided with an internal opening 53 communicating with the inside edges of the vanes so that oil under pressure is available for assisting and holding the vanes in projected position. The means for supplying fluid to the opening 53 and the open space 43 in the variable capacity pump will be treated of hereinafter.

The fixed capacity pump is provided with a stator block shaped to provide with the rotor a four quadrant pump similar to the variable capacity pump. To complete the stator housing, I provide a housing plate 56 one side of which is finished to provide a surface against which the rotor 37 operates, backed by a plate 57, which is either integral with or connected to the output shaft 33. At the opposite side of the stator block is a rotatable ported plate 54 and a rotatable port housing 58 (which for convenience hereinafter will be referred to as the rotatable port housing), and the stator, including the stator block, end plates and rotatable port housing, is secured in assembled relation by nuts and bolts 59.

Referring to Fig. 1 more in detail now, it is seen that I have a variable capacity pump, the capacity of which is adjusted by the control plate 44; an outer stationary port housing 47; an inner rotatable port housing 58, carried by the stator of a fixed capacity pump, the rotor of which is driven by the same shaft which drives the rotor of the variable capacity pump, and the stator of which is connected to or disposed in driving relation with the output shaft 33. Reduced to its simplest aspect, therefore, by the parts catalogued in the preceding sentence, I vary the capacity of the variable capacity pump and by such means control the movement of the stator of the fixed capacity pump, which, in this instance, is analogous to the cylinder 22 of Figs. 7 to 9. The control plate 44 is adjustable to change the capacity of the variable capacity pump. The stationary port housing 47 is constructed to receive the output from the variable capacity pump and the rotatable port housing is so disposed with relation to the stationary port housing as to receive the hydraulic fluid therefrom and supply it to the fixed capacity pump. Concomitantly, the fixed and rotataable port housings are also constructed to return the hydraulic fluid from the fixed capacity pump to the variable capacity pump. In other words, these port housings are analogous from one standpoint to the pipes 26 and 27 shown schematically in Figs. 7 to 9.

Considering the stationary port housing 47 now more in detail, it is provided with a plurality of ports 61 for receiving oil from the variable capacity pump; in other words, these ports are connected to outlet ports in the control plate 44, as will be described. The ports 61 communicate with an annular distributor ring or opening 62 in the stationary port housing 47, so that, in a manner to be described, oil may be distributed from the variable capacity pump through the ports 61 to the intake side of the fixed capacity pump.

The stationary port housing is also provided with a plurality of ports 63 which are the return ports for delivering oil discharged by the fixed capacity pump to the intake side of the variable capacity pump. These ports communicate with the ported control plate 44 and also communicate with an annular distributor ring or opening 64 in the stationary port housing 47.

Now, considering the rotatable port housing 58, it is provided with a plurality of ports 66, communicating at one end by an offset with the intake side of the fixed capacity pump and at the other end with the annular distributor 62, in the stationary port housing 47. The rotatable port housing 58 is also provided with ports 67 (Figs. 1 and 4) communicating with the outlet or exhaust side of the fixed capacity pump and also with the annular distributor 64 in the stationary port housing 47.

Each of the sets of ports in the embodiment shown is provided in multiples of four, this arrangement working out satisfactorily with a four quadrant pump of the character shown. We have then eight ported openings in both the stationary port housing and in the rotatable port housing, with a pair of distributor rings or annular passageways for connecting these sets of ports together, so that the oil delivered from the variable capacity pump always has a free port opening to the fixed capacity pump and the oil from the fixed capacity pump always has a direct passage to the variable capacity pump. This statement is true insofar as the ports themselves are concerned. The actual flow of oil, however, is modified in different ways and for various reasons, principally by the control of the ported control plate 44.

This ported control plate is shown in Figs. 1, 2 and 3. The ported control plate is provided with alternate intake ports 68 and exhaust ports 69. On the side of the control plate, adjacent the stationary port housing 47, these ports are shaped as shown in full lines in Fig. 2; but these ports as they extend through the plate are shaped to communicate with the respective intake and outlet ports 63 and 61 respectively in the stationary port housing 47. The ported control is normally stationary, but it may be partially rotated on the shaft for control purposes. For adjusting the position of the control plate, I employ a reciprocable rack 71 supported in the casing and provided with teeth 72 meshing with teeth 73 on the periphery of the control plate. This rack has a suitable connection, as shown, with a shifting lever whereby pivotal movement of the shifting lever is effective to move the rack 71 vertically and cause a corresponding rotational movement of the control plate 44.

As shown in Fig. 2, the control plate is in neutral position, that is, it is set so that the capacity of the variable capacity pump is the same as the capacity of the fixed capacity pump. This is a position corresponding to the schematic Fig. 9 and at this position there would be no movement of the output shaft 33. Pulling the control lever backwardly or in a left-hand direction (looking at Fig. 1) will raise the rack 71, thereby rotating the control plate in a clock-wise direction (looking at Fig. 2) and decreasing the capacity of the pump.

This decrease in capacity is best understood by studying Fig. 3. In this figure, the control plate 44 containing the intake ports 68 and the exhaust ports 69 is shown in back of the rotor which carries the vanes 41.

At the position of the control plate in this figure, the pump has a capacity approximately 20% less than its maximum, or about the same capacity as the fixed capacity pump, (assuming a maximum capacity of 25% greater than the fixed capacity pump). The space between the vanes is substantially exactly equal to the space between the ports. As a result, when the intake port is closing the exhaust port is at that instance opening to the space between any set of vanes.

When the vanes are moving outwardly to the point of maximum rise, there is a constant suction due to the volume in the space enclosed by the vanes and stator wall progressively growing larger. If this space is in communication with an intake port during the entire suction period, then we have a condition in which the pump delivers its maximum capacity. With the ports set as in Fig. 3, however, the intake port is closed and the exhaust port opened for a very short time (4° radially, approximately), and so instead of withdrawing all of the oil from the intake port, some oil is withdrawn from the exhaust port. As soon as the rear vane of any pair of vanes reaches the rise, or pressure side of the quadrant, however, discharge begins to take place, and the oil is delivered to the exhaust port 69.

It should be remembered that since there are a number of ports, a multiple pump of this character is discharging oil at all times when set to deliver oil. Even though there are times when some oil is drawn in through an exhaust port, there is a relatively large amount of oil being delivered through another exhaust port to compensate for it and the final result is a steady stream of oil substantially without pulsation. The uneven number of vanes aids in obtaining this result.

As the control plate 44 is moved in a counter-clockwise direction in Fig. 3, there is gradually more oil drawn from the outlet ports and less from the inlet ports, until, in a position of zero capacity, the ports overlap the intake and outlet positions of the stator, and the oil is merely moved back and forth through the ports, both intake and exhaust ports being exactly similar in this respect. The position of the ports at zero capacity is best understood by considering that if a radial line were drawn between the intake and exhaust portions of a pump quadrant, such line would divide one of the ports into two exactly equal ports.

If the ported control plate is moved to a position beyond that described in the condition of zero capacity (direct forward drive) there is gradually more oil drawn from the exhaust ports 69 than from the intake ports 68, which results in a reversal of the ports and a flow of oil to and from the variable capacity pump in a reverse direction. By this provision, overdrive is obtained.

In the embodiment shown, particularly as will be explained in connection with Fig. 11, the variable capacity pump has a maximum possible capacity of 25% more than the capacity of the fixed capacity pump. Accordingly, when the lever is pushed forward and the maximum capacity thereof is delivered to the fixed capacity pump, the stator thereof is forced to turn in a reverse direction in accordance with the formula explained in connection with Figs. 7 to 9. Applying the values to the formula in full reverse drive, therefore, the gear ratio will be 4 to 1, or the shaft 33 will turn at one-fourth the speed of shaft 31 and in a reverse direction.

As to further details of the control mechanism, I provide a spring pressed detent 76 engaging in a cam slot in the rack to hold the rack in the neutral position in which it is shown. A flat spot 77 is adapted to engage against the lower portion of the rack to limit the upward movement thereof in full forward position while a corresponding flat spot 78 functions as a stop by engaging against the rack in its lowermost or full reverse position. As the drawings show, there is nothing to prevent the controls from being held in any intermediate position. In other words, a full range of speeds is available with no limitation requiring a fixed drive or torque ratio at any time. In the preferred form of the invention, the casing 32 is entirely filled with oil and every open space of the mechanism housed in the casing is also filled with oil. In this connection, other hydraulic fluids besides oil may be used and, where I speak of oil as the hydraulic medium, it is only by way of explanation and has no limiting significance insofar as the operation of the mechanism is concerned. I wish to state, however, that I prefer oil or an oil-like medium because, with the entire casing filled with the hydraulic medium, it lubricates itself and other advantages are secured.

Those skilled in the art will understand readily that in the operation of a system of this kind, there are continual fluctuations of pressure depending upon the load conditions. There are times when the motor is laboring, as, for example, when driving an automobile up a hill, and there are other times when there is a tendency for the car to overrun the engine, at which times the so-called free-wheeling principle may be utilized. I employ, in addition to the port connections between the two pumps, a system of oil control by means of which several advantages may be obtained.

Included in the advantages is free-wheeling when it is desired, direct drive so that the engine may be utilized as a brake, means for maintaining the oil in a cool condition at all times, means for automatically replenishing the oil and keeping the casing filled with oil, and other advantages. Among the important features which utilize what may be termed the low pressure system, is means for preventing "creeping" of the automobile. In conjunction with the control of oil outside of the ports directly connecting the two pumps is a means for maintaining the high presure against the vanes to assist in holding them outwardly against the stator casing. These are refinements of the invention utilized without sacrificing in any respect the great advantages obtained from the utilization of the simple drive principle disclosed.

In addition to the ports previously described, the stationary port housing 47 is also provided with ports 79 (Fig. 4), three in number, communicating by port extensions 81 to a low pressure chamber 82 extending over the equivalent of three quadrants of the stationary port housing and disposed between the stationary port housing and the outside casing. These ports lie between the ports 63, connected to the intake ports in the control plate, and the ports 61, communicating with the exhaust ports of the control plate. In a manner to be described more in detail hereinafter when the operation is considered, when the control plate 44 is set so that the variable capacity pump has the same capacity as the fixed capacity pump, that is, when the transmission is in neutral position, the ports 79 bridge over slightly both the intake and exhaust ports in the control plate 44 in such a way as to connect both of these ports to the low pressure chamber.

In order to control free wheeling, I provide a pair of valves 83 and 85 which can be closed off to permit the development of a pressure in the low pressure chamber 82, which would prevent free-wheeling and conversely when this valve is open would allow free-wheeling. The valve 83 is automatically controlled when the brake is operated, as will be explained. The valve 85, however, is manually operated. Both valves must be open to permit free-wheeling, but when either valve is closed, the drive is bi-directional.

In addition to the chamber 82, there is an open space 84 entirely surrounding the major portion of the apparatus and disposed between the apparatus and the casing. This open space is filled with oil and it is from this oil space that oil is supplied as needed to the pumps and ports, where it is utilized in driving the transmission. This oil is sucked in through check valves 86 and 87 (Fig. 17), depending upon the operation of the system. Each of these check valves is connected at one side of the oil space or oil storage chamber 84. The valve 86 discharges into the annular distributor 62 and the ports 66. The valve 87 discharges into the annular distributor 64 and the ports 67. At different stages of the operation, one of these systems of ports becomes the low pressure side and the other system the high pressure side, and this character of the two sets of ports will vary in different driving conditions. The check valves are so arranged that it is impossible to discharge from the ports into the oil storage space 84, but if the pressure in the low pressure side is below atmospheric, i. e., if there is a shortage of oil, the corresponding check valve 86 or 87 will be forced from its seat and the oil in the space 84 under substantially atmospheric pressure will enter the low pressure port system. By this means, oil is constantly admitted from the storage space 84 as it is required in the transmission system.

In order to maintain a full supply of oil in the space 84, I utilize an oil tank 91 (Fig. 18) disposed above the transmission, which tank is adapted to contain a full supply of oil for delivery by gravity to the transmission casing. I also utilize this tank as a cooling, air and dirt separating tank and for this reason provide means for continually delivering the major portion of the oil from the transmission to the tank 91 and back again. As shown in Figs. 1 and 5, I provide a volute section 92 in the casing 32 in line with the fixed capacity pump. At all except the neutral position, the stator of this pump rotates. At direct forward speeds, it rotates at the same speed as the shafts 31 and 33, and all of them rotate as a body. By shaping the casing with a volute in the manner shown, I am able to utilize the stator of the fixed capacity pump as a separate centrifugal pump for pumping the oil through pipe 93 to the tank 91.

The oil flows by gravity from the tank 91 through a pipe 94, back into the upper part of the casing (Fig. 3). From a study of Figs. 1 and 3, it will be apparent that the stator block 36 is provided with a peripheral open space 96 and it is with this open space that the pipe 94 communicates. Since this open space extends completely around the stator, it communicates with the oil supply space 84 in the lower part of the casing and oil admitted through pipe 94 is, therefore, able to move to any part of the low pressure system between the casing and the enclosed apparatus. I have already explained the manner in which this oil is taken from the low pressure or atmospheric portion of the casing and delivered to the pressure system.

Now, with respect to the free-wheeling arrangement, the valves 83 and 85 are vented to the cooling and air separating tank 91. In Fig. 18 I show a short pipe 97 communicating with the pipe 93 leading to the tank 91. In addition to its function as a cooling and air and dirt separating tank, the tank shown in Fig. 18 has other functions and advantages as will appear hereinafter.

It will be recalled that I provide means for conveying oil under pressure to the inside edge of the vanes of the two rotors for the purpose of aiding them in maintaining their position against the stator casing or stator block, as the annular portion of the stator has been termed. Looking at Fig. 1, I provide a separate chamber 98 in the stationary port housing, closed at one end by a screw plug 99, and closed at the opposite end by the control plate 44. The annular distributor 62 is in communication with this chamber by a port 101 in a shell 102 disposed in the chamber. The chamber is also in communication with the annular distributor 64 through a port 103, this port being disposed between one of the return ports 63 and the chamber 98. A valve or piston 104, slidably disposed within the chamber, is adapted to seat in one direction against the shell 102 and in the other direction against an annular shoulder 106 provided in the chamber.

Immediately adjacent the chamber 98 is a high pressure chamber 107 (see Fig. 4), in communication with the chamber 98 by a port 108. In the operation of the transmission, high pressure may be present in either the port system running from the variable capacity pump to the fixed capacity pump (which may be termed the supply circuit) or from the port system leading from the fixed capacity pump to the variable capacity pump (the return circuit). In other words, through the ports 101 or 103 high pressure may be in communication with either side of the valve chamber 98. As a result, the valve or piston 104 is always forced in a direction to close the low pressure side, thereby always maintaining a direct hydraulic connection between the port 108 and the high pressure side of the system.

Since by this means relatively high hydraulic pressure is maintained in the high pressure chamber 107 during substantially the entire time that the transmission is in operation, any ported means for admitting pressure from the high pressure chamber to the vanes will accomplish my result. I show an annular port 109 formed partly in the stationary port housing 41 and partly in the ported control plate 44. This annular chamber is in communication with the pressure chamber 107 by a port 111 which can be seen in Fig. 1 in dotted lines running at an angle and then vertically to connect the two chambers. This communicating port 111 is also shown in full lines in Fig. 16.

Referring now to Fig. 3, a plurality of slots 112 disposed midway between the keyways 42 are provided in the rotor block and communicate with the annular port 109 on one side by suitable means shown and on the other side with the pressure space 43 directly communicating with the inner edges of the vanes 41.

To communicate hydraulic pressure to the vanes in the fixed capacity pump, I provide a hollow space 113 in the shaft 31 with which the pressure space 43 is in communication by a radial port 114. At the fixed capacity pump, radial ports 116 communicate with the pressure space 63 in the rotor block, which space, as in the case of the variable capacity pump, is also in communication with the associated rotor vanes.

I also provide safety means for limiting the pressure which can be developed in the pressure side of the system. There is always a possibility of breakage, particularly when running at comparatively low speed or when the torque ratio is relatively great between the input and output shafts. By utilizing the fact that the chamber 107 may be in communication with either side of the system, I am able to provide a single pressure relief means, as shown particularly in Figs. 1 and 4.

At the lower side of the chamber 107, I provide a port 118 and shape the stationary port housing to provide a valve seat 119, against which a valve 121 is adapted to seat. This valve is normally pressed against the seat by a spring 122, the pressure of which may be regulated by a pressure nut 123 screwed into a boss 124 in the main casing 32. The boss is adapted to be closed by a plug 126. By this means, it is clear that the spring 122 may be set to any suitable predetermined pressure so that, when pressure in either side of the system in communication with the chamber 98 through the action of the valve 104 is raised to a point which will tax the mechanical strength of any of the associated apparatus, the valve 121 will be opened and some of the oil will be vented into the low pressure chamber 84 in the casing.

To avoid building up a high end thrust between the various portions of the transmission, I vent to atmosphere any portions thereof in which the high pressure communicating to space which may be found between the parts would cause an end thrust against such parts. For example, between the rotatable port housing 58 and the stationary block 55, I provide an annular space 127 connected by one or more vents 128 (Fig. 16) with the low pressure portion of the casing. I also provide vent openings 129 between the space occurring at the end of the casing between the housing or casing cover 51 and the stator end plate 46 communicating with the annular open space 96, which in turn is in communication with the low pressure portion of the casing. The plate 57 is also provided with one or more vents 131 to prevent building up pressure between the plate 57 and the inner end of shaft 31.

Referring now to Fig. 18, the pipe 93 communicates with one side of the tank 91, while the pipe 94 communicates with the opposite side thereof. Between the openings to the two pipes, I provide a plurality of screens 132 shown somewhat schematically. These screens may have any suitable shape and their function is to prevent any solid material from passing through the tank 91 into the pipe 94. It will be noted that a filler cap 133 is on the same side of the tank as that with which the pipe 93 communicates. When it is necessary to supply additional oil to the system, it is done through the filler opening covered by the cap 133, and any foreign material which by any chance may be present in the oil is screened out. Preferably, the cap 133 is vented so as to function as an ordinary bleeder pipe to allow air or gas or other vapor which may be present in the system to pass into the atmosphere.

The tank 91 may be placed at any suitable position, but, as shown in Fig. 18, I prefer to locate it in such a way as to utilize the cooling effect of the usual fan 134. Those skilled in the art will understand that the tank 91 may be provided with fins or any other type of device to facilitate removal of heat from the oil contained therein, if necessary. Due to the construction of my transmission, however, the oil is normally maintained at a considerably lower temperature than in other types of hydraulic transmission devices with which I am familiar.

*Operation.*—In general, the manner in which the device of my invention functions will be understood from the preceding description. Those skilled in the art, however, may be assisted in understanding the invention by a more complete description of the operation.

Assuming the transmission has been installed and contains no oil, the first requirement in the operation is to fill all of the parts with oil or any suitable hydraulic fluid. The first step is to remove plugs 138 and 139 at the top of the casing and to see that plug 141 as well as plug 126, at the bottom of the casing, are tight. Now set lever in "high" position to put variable pump at "0" capacity. Oil is now poured in through the opening 133 in the tank and, with both plugs 138 and 139 removed, air is permitted to escape through the top of the casing and oil will flow through both pipes 93 and 94 into the casing, all of the parts of which now are at atmospheric pressure. The shaft 31 may be turned slowly until it begins to "take hold" to facilitate admission of oil to the hydraulic circuit including the two pumps. By this means, the entire casing may be filled with oil and enough oil admitted to the hydraulic circuit through the oil pressure chamber 82 and ports 81 to permit the pumps to operate hydraulically.

As soon as enough oil is admitted to cause a movement thereof through the hydraulic circuit, operation of the transmission will automatically remove the additional air, assuming, of course, that sufficient oil is supplied to the tank 91 to replace it. This is particularly brought about by allowing the transmission to "free-wheel". The air at this time is passed to the tank 91 through the pipe 93 and oil returned through the pipe 94 to take its place. It is understood, of course, that before the operation of the transmission is started, the plugs 138 and 139 are replaced.

At any time, but preferably after the transmission has been filled with oil so as to operate, the relief valve spring 122 is adjusted to the proper tension by the adjusting nut 123. Those skilled in the art will understand how to make this adjustment. In general it may be stated, however, that after the proper setting of the relief valve for a particular size of transmission driven by a particular size of power plant has been determined experimentally, the relief valve adjustments of a series of subsequently manufactured transmission units may all be the same. After an automobile has been driven with this predetermined setting, the relief valve may be further adjusted if the operating characteristics of the transmission disclose that the maximum possible oil pressure is either too high or too low.

The automobile engine is started in the usual way with the shifting means at a neutral position. At this position, the capacity of the control pump at the right hand side of Fig. 1 is the same as the capacity of the fixed capacity pump at the left of Fig. 1. At this time, the ports in the control plate and stationary port housing are in positions indicated schematically in Fig. 13. As this figure shows, the intake ports 68 in the control plate 44 due to their enlargement on the reverse side of the plate are in communication with the ports 63 which form part of the return circuit from the fixed capacity pump; and exhaust ports 69 in the control plate 44 are in communication with the ports 61 forming part of the supply circuit to the fixed capacity pump. At the same time, the intake and exhaust ports communicate with ports 79 in the stationary port housing, overlapping both edges of the ports 79, say approximately three degrees.

With the ports disposed in this position and the control plate set so that the capacity of the variable capacity pump is the same as the fixed capacity pump, all of the oil delivered from the variable capacity pump will be delivered to the fixed capacity pump and returned through the hydraulic circuit. At this time, the same condition exists, as explained schematically in Fig. 9, and not only does the shaft 33 fail to turn but theoretically it would be impossible to turn this shaft by the application of any force within the limits of the design. In this embodiment, however, when both sides of the hydraulic circuit are in communication with each other through the ports 79, which are also in communication with the low pressure chamber 82, the output shaft can be turned. When set at neutral, therefore, the engine does not act as a brake and the automobile may be freely pushed or towed, whether the engine is running or not.

The overlapping of the intake and exhaust ports with the ports 79 in neutral position serves another useful purpose. From a consideration of the equation, $$R = P\left(\frac{A}{A-a}\right)$$

it is evident that if there were a very slight difference between the capacity of the variable capacity pump and the capacity of the fixed capacity pump, there would be a very high torque ratio approaching infinity between the shaft 31 and the shaft 33. Translated in terms of operation of the transmission, this would mean that under these conditions the automobile would move either forwardly or backwardly very slowly but with tremendous power. This is an entirely undesirable situation, which is avoided by the arrangement of the ports in the manner shown in the neutral position.

At a short distance on either side of neutral, equivalent for example to three degrees movement of the control plate 44, both sides of the hydraulic circuit are kept in communication with the low pressure chamber 82. This prevents building up pressure in either side, which is necessary before the fixed capacity pump can operate to drive the shaft 33. This situation is not affected by the position of the free-wheeling valve because, even though this valve might be closed, the ports 61 and 63 remain hydraulically coupled a short distance on either side of neutral.

In the further consideration of the operation, it will be of some assistance to divide the hydraulic circuit between the two pumps, each of which comprises a pair of pump elements, into two parts, or separate circuits. The ports 61 and the ports in communication therewith constitute the oil supply connection from the variable capacity pump to the fixed capacity pump and may be termed "the supply circuit." The ports 63 and ports in communication therewith receive the oil return from the fixed capacity pump and deliver it to the variable capacity pump and may be termed "the return circuit". Normally the flow of oil is in the direction indicated by the terminology employed, but under some conditions the oil flow may be reversed. These terms are used, therefore, for simplicity only and not in any limiting sense. When I speak of the two sides of the hydraulic circuit, the supply circuit constitutes one side and the return circuit the other side.

When it is desired to drive the automobile forwardly, the control plate is rotated through the operation of the rack 71 either manually or preferably automatically to decrease the capacity of the variable capacity pump. In this operation, the control plate moves in the direction indicated by the arrow in Fig. 2. Looking at Fig. 14, which represents the position of the ports in full forward position, the control plate 44 is moved in the direction of the arrow shown in this figure, it being understood, of course, that the rotor is rotated in the direction indicated by the arrow adjacent the center point of the figure. Considering the full forward position, it will be seen that the supply circuit (port 61) is still in communication with the discharge port 69 and the return circuit (port 63) is still in communication with the intake port 68 of the variable capacity pump. At this time also the port 79 is in communication with the discharge port 69. At this position of plate 44 capacity of pump is zero and no fluid is entering or leaving the variable pump.

The discharge of the fixed capacity pump per units of time is determined by the difference in rotation of the shafts 31 and 33. At the direct forward position, the variable capacity pump is pumping no oil and there is substantially no oil movement between the two pumps, and the shafts are caused to move at substantially the same speed. However, at this time, when the engine is driving the car, a high pressure exists in the return circuit and a low pressure in the supply circuit. A study of Figs. 7 to 10, particularly a consideration of Fig. 7 will show that this condition must exist. Considering Fig. 14, it is clear that the return circuit (port 63) is shut off from the low pressure port 79, and a high pressure may be developed therein. The normal condition of the supply circuit, however, is one of low pressure and so having the supply circuit 61 in communication with the low pressure port and through the valve 83 to atmosphere does not affect the operating characteristics of the transmission in any way while the shaft 31 is driving the shaft 33.

It is through this connection, however, that I obtain my free-wheeling characteristics. As soon as there is a tendency for the shaft 33 to overrun the shaft 31, there is a tendency for the fixed capacity pump to reverse its action and develop high pressure in the supply circuit. However, since the circuit is in communication with atmosphere, it is impossible to develop a pressure and the shaft 33, therefore, turns free, overrunning the shaft 31 and free-wheeling results. If the operator does not desire free-wheeling, it is merely necessary to close the valve 85, which will permit the development of a pressure in the normally low pressure chamber 82 and, when this condition exists, the fluid cannot flow and the shaft 33 can drive the shaft 31 and the motor may be used as a brake. This may be made to occur as an incident to the application of the foot brake as will appear hereinafter.

From a consideration of the principles which I employ, it is obvious that the control plate 44 may be set to any intermediate position between the positions shown in Fig. 14 and Fig. 13 which is the neutral position. In any intermediate position, the shaft 33 will be driven in the same direction that the shaft 31 is rotating, but at a slower speed. It is clear that as the control plate is shifted in the direction indicated by the arrow in Figs. 2 and 14, the variable capacity pump gradually decreases in capacity to zero in position shown in Fig. 14. The relative speeds or torque ratio at any given setting of the control plate is determined by the equation previously considered. In other words, if the capacity of the variable capacity pump is half the capacity of the fixed capacity pump, the torque and speed ratio between the shafts will be of the order of two to one.

The operation of the transmission to drive the automobile in reverse is not dissimilar to the forward drive, except that the flow of fluid in the circuit increases instead of decreasing. In reverse drive, however, the capacity of the variable capacity pump is greater than the capacity of the fixed capacity pump (see Fig. 10). In full reverse drive (with the embodiment of the present invention in which the variable capacity pump has a maximum capacity approximately 25% greater than the capacity of the fixed capacity pump), the ports assume the relative position shown in Fig. 12. It will be seen that the return portion of the hydraulic circuit is in communication with the port 79 and, hence, in communication with the low pressure chamber 82, while the supply portion of the hydraulic circuit is in communication only with the exhaust port 69 of the variable capacity pump but not in communication with the low pressure port 79.

This position of the ports is brought about by moving the control plate 44 in a clockwise direction, looking at Fig. 12, or in a counter-clockwise direction, looking at the opposite side of the control plate, as in Fig. 2. From a consideration of the relative position of the ports in the control plate, with respect to the four quadrants of the variable capacity pump, it is evident that at this reverse position of this control plate, the maximum possible capacity of the pump is attained. As previously explained, the control plate is prevented from moving to a position beyond that representing the maximum capacity by the stop surface 78 (Fig. 2).

When the transmission is set to cause a reverse drive of the shaft 33, the supply side becomes the high pressure side and the return side becomes the low pressure side. Looking at Fig. 12 again, it is apparent that the return circuit 63 or normally low pressure side in reverse is connected to atmosphere through the ports 79 with the result that free-wheeling is accomplished in reverse the same as in forward drive when the valve 83 is opened. Similarly, free-wheeling can be cut out in reverse drive by closing this valve. It follows as in forward position that any position of the control plate intermediate positions shown in Figs. 13 and 12 will cause a reverse drive with the single exception, of course, that no driving action takes place within the neutral zone or until the ports 69 are taken out of communication with the ports 79.

For convenience in following the hydraulic flow, the ports in Figs. 12 to 14 are provided with a series of arrows which represent the prevailing movement of the fluid. I also show a hydraulic diagram in Fig. 15 but before considering this diagram further details of the operation will be considered.

The entire transmission is designed to be completely filled with oil at all times; and due to the construction employed, there will be very little tendency for the leakage of oil from the hydraulic system. However, there will be some slight escape of oil and, when the automobile "free-wheels", there will be a considerable escape of oil through the free-wheel valves. The high pressure side of the circuit will tend, at all times, to remain filled with oil by reason of the action of the pumps alone and any shortage of oil will tend to manifest itself by the creation of a sub-atmospheric pressure in the low pressure side of the circuit, which is in communication with the fluid filled casing through either one of check valves 86 and 87. At any time when pressure in either the supply or return circuit is less than the pressure in the outer casing, one of the valves will be unseated and admit oil until the pressure is substantially equalized. The check valve action of these two valves, however, will at all times prevent high pressure fluid in the system from discharging into the outer casing.

The oil pressure on the inside edges of the vanes is maintained the same as the maximum oil pressure in either side of the system. Due to the action of the valve 104, the oil chambers 43 and 53 adjacent the vanes in both pumps is always in hydraulic communication through the passages 98, 108, 107, 111, 109 and 112 with the high pressure side of the system. The series of ports and openings communicating with the vanes is really then a part of the hydraulic system connected into the high pressure side thereof and may be termed the "vane system".

I have already described the action of the relief valve 121. It is clear that particularly at high torque ratios, it is possible to develop an enormous pressure in the high pressure side of the system and, if the output shaft 33 for any cause whatsoever resists movement, serious breakage might occur. All of the parts of the transmission and all of the drive parts of an automobile, for that matter, are constructed with an ample factor of safety, but, due to the fact that torque ratios higher than usual are possible with my transmission, it would be practically impossible to design all moving parts to withstand the exceedingly high pressures developed.

By setting the spring in a way to limit the pressure to a value calculated to be safe, no harm can come to any portion of the apparatus as when the safety limit is exceeded, a portion of the fluid in the high pressure side will be continuously vented through the relief valve and this fluid will be continuously replenished through one of the valves 86 or 87. This venting action, it is true, tends to generate heat and is undesirable for this reason. Since it is meant as a safety precaution entirely, however, and possibly may never operate in normal operation of an automobile, its presence in the transmission may be of considerable value.

The neutral zone in itself acts as a safety feature in addition to acting to prevent creeping. Without this neutral zone substantially infinite gear ratios would be possible, which might result in breakage should the output shaft resist movement.

Now, considering the hydraulic circuit in Fig. 15, it is seen that the variable capacity pump circuit indicated schematically at the right, is set to what is usually termed "direct forward drive", that is to say, a position in which the torque ratio between the input and output shafts is of the order of one to one. At this time, there is no movement of oil through the supply and return circuits indicated by the words "supply" and "return". I show arrows indicating the normal direction of flow, however, at speeds in which the torque ratio is greater than one to one. It will be understood, therefore, that throughout the hydraulic diagram, the arrows generally indicate the direction of flow but are not to be taken literally under all conditions.

In the hydraulic circuit, I indicate schematically the position of the free-wheeling valves 83 and 85, the safety valve 121, and two check valves 86 and 87 for admitting fluid from the casing 23 to the hydraulic circuit, and the control piston valve 104 in its chamber 98. The vane system, also indicated schematically, is marked "vane" for identification.

Fig. 11 is a mathematical representation of the operation of my transmission based upon the displacement per revolution of the two pumps. The curve represents the equation $$R = P\left(\frac{A}{A-a}\right)$$

plotted with the resulting torque R as ordinates and displacement of variable capacity pump $a$ as absissas. The displacement of the variable capacity pump indicated by the character $a$, in Figs. 7 to 9, is in terms of the displacement A, of the fixed capacity pump and the resulting torque R of the output shaft is in terms of the torque P imposed on the input shaft. By a study of Fig. 11, it is clear that with a displacement of $a$ equal to five-fourths of A, the value of "R" at the left of the chart = −4P which indicates that a reverse torque of four to one is obtained, and inversely, the output shaft will rotate at one-fourth the speed of the input shaft but in a negative direction. The shaded portion on both sides of the two axes represents the neutral zone in which no driving movement takes place on account of the junction of the supply and return circuits through port 79 (Fig. 13). From a study of the curve where the value of $a$ is less than A, it is clear that I can obtain a complete range of forward torque ratios from approximately 8 P to P, where P represents the torque of the input shaft. In other words, I have a complete range of torque ratios from a torque ratio of approximately eight to one to a torque ratio of one to one with a corresponding inverse range of speed ratios.

The description of the operation is based upon a control of the control plate 44 wherein the capacity of the variable capacity pump ranges from zero to a capacity of approximately 25% more than the capacity of the fixed capacity pump. From a study of Fig. 2, however, it is clear that the control plate 44 may be shifted further to a position representing reversal of the intake and exhaust ports of the variable capacity pump. In effect, this causes the pump to work backwards and the exhaust port becomes the intake and the intake the exhaust. When the ports in the variable capacity pump are reversed, they may again be positioned to vary the capacity of the variable capacity pump in a reverse direction. When these ports are reversed, the movement of the oil in the hydraulic circuit will also be reversed and will flow through the hydraulic circuit 63 heretofore referred to as the return circuit, then through the fixed capacity pump, then to the portion of the circuit 61 heretofore referred to as the supply circuit and back to the variable capacity pump. The result of this reverse flow is an overdrive of the shaft 33. Those skilled in the art of mathematics will understand how to continue the chart in Fig. 11 for negative values of $a$ when my transmission is set for overdrive. Further description of the overdrive, therefore, need not be given.

My invention lends itself to the provision of automatic transmission operation for decreasing the torque ratio as the speed of the automobile is increased. It is clear that any suitable means operated automatically in response to the speed of the automobile, may be made effective to shift the control rack 71. In Fig. 19, I show one embodiment of a suitable control mechanism adapted for use with the transmission of my invention.

This figure, in part schematic, shows a driver's seat 141, the usual type of steering wheel 142 and a dash 143. The input shaft 31 has a flywheel 144, an extension of the shaft 31 extending into the housing 32. In the form shown, the fly wheel housing forms the end plate 51 of the transmission casing. The output shaft 33 may be considered as the propeller shaft running to the usual differential (not shown) for driving the rear wheels. My preferred means of controlling the transmission automatically is operated in response to the speed of the output shaft. It will be understood that the shaft indicated as 33 in Fig. 19 may be merely an extension of the output shaft shown in Fig. 1, for example, but coupled thereto, or any other element revolving in coordination with shaft 33. For the purpose of the present explanation, however, it may be assumed that the shaft 33 in Fig. 19 is the output shaft.

The output shaft is provided with a housing 146 at an enlarged portion of which a control arm 147 is pivoted as at 148. The lower end of the control arm rides in an annular groove 149 in a control block 151 feathered on the shaft 33. Adjacent the slidable control block 151, I mount a bracket 152 carrying centrifugally operated devices 153. These devices are in the form of bell cranks pivoted to the bracket 152, one of the arms thereof engaging against the block 151 and the other arms provided with weights 154. It is clear that rotation of the shaft 33 tends to move the weights outwardly from the axis by centrifugal force thereby forcing the block 151 in a left hand direction and actuating the control arm about its pivot 148.

In order to return the control arm 147 to the at rest position, I provide a spring 156, having one end secured to the upper part of the control arm and the other end secured to a cable 157. This cable is brought up to a suitable tension control mechanism 158 placed on the dash so that by adjusting the position of the tension control mechanism the tension of the spring 156 can be modified. Since the centrifugal devices must operate against the force of the spring 156, it is clear that the tension in this spring will determine the force which the centrifugal devices must exert before imparting movement to the control arm 147. The centrifugal force is determined by the speed of the output shaft 33 so that it is clear that by adjusting the tension control device 158, the speed at which the automobile is travelling when direct transmission occurs may be predetermined.

By utilizing the movement of the control arm 147, the control rack 71 may be adjusted to change the drive ratio between the input and output shafts. For shifting between reverse and forward drive, I employ a construction utilizing in a general way the principle of the Stevenson link. A double bell crank lever 159 is pivoted at 161 to the transmission casing and has an arm slidably pivoted at 162 to the top of the control rack 71. The double bell crank lever is provided with a substantially vertical slot 163 in which a small block 164 is adapted to slide. In the position shown in the drawings, the block 164 is at the top of the slot. This is the forward drive position and means is provided for shifting to the reverse drive position as will be shown.

Normally the double bell crank lever 159 is in a position to hold the rack 71 in the neutral position. I provide means, however, to initiate movement of the shaft 33, this means being operated preferably as an incident to the speeding up of the engine. The usual foot throttle 166 projecting through the floor boards has its lower end connected to a lever 177 pivoted at 178. This lever has an arm 179 pivoted to a carburetor control rod 181, the movement of which, in a suitable manner understood in the art, will increase the speed at which the internal combustion engine runs. The lever 177 also has an arm 182 which engages by cam connection one arm of a bell crank lever 183 pivoted at 184. The opposite arm of this lever 183 has a pivotal connection to a link 186 connected to the sliding block 164.

It is seen that the arm engaged by the arm 182 (a roller as shown may be employed) has a cam surface 183a so shaped that when the foot throttle is pressed downwardly the bell crank lever 183 moves on its pivot in a counter-clockwise direction and through the link 186 moves the double bell crank lever 159 past the neutral position. This will be a position in which the port 68 (Fig. 13) is moved in a counter-clockwise direction out of register with the port 79. This, through the operation previously described, starts the output shaft 33 rotating at or above approximately one-eighth the speed of the input shaft.

As soon as the shaft 33 starts to rotate, the centrifugal devices carried by it begin to operate and gradually force the control block 151 against the action of the spring 156 in a left hand direction. The control arm 147 is connected by a suitable link 187 to the block 164. Accordingly, movement of the control arm, as the shaft begins to turn, causes a still greater movement of the double bell crank arm 159.

The shaft 33 gradually increases in speed due in part to the fact that the engine may be gradually driving faster and also due to the automatic shifting of the rack 71 thereby decreasing the torque ratio between the input and output shafts. In this way, the output shaft is gradually brought up to the speed of the input shaft, the length of time required being determined by tension on the spring 156, the less the tension, the shorter the length of time. When the transmission is constructed to permit overdrive, the speed of the shaft 33 will gradually increase as the momentum of the automobile increases until finally the shaft 33, at relatively high automobile speed, will be rotating faster than the shaft 31.

For reverse drive, I provide a foot pedal 188 near the accelerator pedal 166 in the form of a rod, the lower end of which is pivoted to one arm of a lever 189, another arm of which has secured thereto a link 191 which, through suitable connections such as shown, including a vertical link 192, double arm levers 193 and 194 and a connecting link 196, is adapted to pull the block 164 to the opposite end of the slot 163. Movement of the double bell crank lever 159 thereafter, either through the link 186 or the link 187, will move the double bell crank in a counterclockwise direction thereby depressing the rack 71 and carrying it to the reverse position in which the ports will be moved to the position shown in Fig. 12. It will be understood that the foot pedal 188 and the foot throttle 166 are so positioned that they can be operated by the same foot.

As shown in Fig. 19, the free-wheeling valve 83 is operated by the brake pedal 197. The brake pedal is shown pivoted on a pin 198 carried by the casing 32 and secured to a brake rod 199 which, in a suitable way, operates a suitable type of wheel brake. A short free-wheeling control lever 201 is provided and suitably connected to the control valve 83 and this lever, through a link connection 202, is moved as an incident to the operation of the brake pedal. With this arrangement, the transmission may be set for free-wheeling at all times when the foot brake is not applied. However, when the foot brake is applied to bring the automobile to rest, the valve 83 is closed and the engine operates as a brake, and therefore, during deceleration, the shaft 33 slows down, the weights 154 are forced inward by the spring 156 and, as the automobile is coming to rest, the bell crank 159 is operated to bring the control plate 44 to the neutral position, through all the intermediate torque ratios and correspondingly multiplies the braking effect of the engine.

It will be understood that either the free-wheeling valve 83 or 85 may be used alone, or I may provide no free-wheeling control valve, in which case the transmission could be constructed to free-wheel at all times or, on the other hand, could be constructed so that it would never free-wheel. From this consideration, it is clear that the free-wheeling control is merely a valuable adjunct, but some of the most important features of my invention may be utilized either with or without free-wheeling.

The free-wheeling control valve 85 is shown operated by a handle 90 which could, for example, project up through the floor boards. Those skilled in the art will understand that this is merely illustrative, however, as the control for this valve may be placed in any suitable position utilizing well known mechanical remote control devices.

The invention has been described throughout with the rotor of the fixed capacity pump secured to the input shaft and the stator of this pump secured to the output shaft. It is obvious, however, that substantially the same results can be secured by reversing these connections. It is the relative movement between the stator and rotor of the fixed capacity pump which is important and the two pump elements thereof are interchangeably connected to the output and input shafts.

The term "stator" is employed with the fixed capacity pump somewhat arbitrarily, as in direct forward drive the outer pump element is not in fact a stator but rotates at the same speed as the rotor. Wherever these terms are employed, it is obvious that they are employed in the sense of pump elements except where the context indicates a specific or literal meaning. The pumps are described as rotary vane pumps. Other forms of pumps, however, may be employed without departing from the spirit of the invention.

Although I have described my invention in detail to permit those skilled in the art to practice it, it is obvious that I am not restricted to the specific form shown and the invention is limited only by the scope of the appended claims.

What I claim as new and desire to protect by Letters Patent of the United States is:

1. In a hydraulic transmission, a power input shaft, a power output shaft, a rotary variable capacity pump having a stationary stator and a rotor secured to and driven by said input shaft, a fixed capacity pump having less capacity than the maximum capacity of the variable capacity pump, said fixed capacity pump having a rotor driven by said input shaft and a stator connected to the output shaft whereby the capacity of said fixed capacity pump per revolution of the input shaft is determined by the difference in rotation of the two shafts, and ported means forming a connection between the discharge side of the variable capacity pump and the intake of the fixed capacity pump, and ported means forming a connection from the discharge side of the fixed capacity pump to the intake of the variable capacity pump, and a casing surrounding said pumps adapted to contain oil under substantially atmospheric pressure, a cooling and separating tank, and means utilizing the stator of the fixed capacity pump as a separate impeller for discharging oil from the casing and delivering the same to the cooling and separating tank, and gravity means for delivering oil from said tank back to the casing.

2. In a hydraulic transmission, a power input shaft, a power output shaft, a rotary variable capacity pump having a stationary stator and a rotor secured to and driven by said input shaft, a fixed capacity pump having less capacity than the maximum capacity of the variable capacity pump, said fixed capacity pump having a rotor driven by said input shaft and a stator connected to the output shaft whereby the capacity of said fixed capacity pump per unit of time is determined by the difference in rotation of the two shafts, ported means forming a connection from the discharge side of the variable capacity pump to the intake of the fixed capacity pump, a connection from the discharge of the fixed capacity pump to the intake of the variable capacity pump, means for varying the capacity of the variable capacity pump from zero capacity to capacity greater than the capacity of the fixed capacity pump whereby the torque ratio of the output shaft may be controlled within ratios representing neutral, direct drive, and reverse drive, and means for venting both interconnecting ports between the pumps at positions at both sides of neutral whereby creeping is avoided.

3. In a hydraulic transmission, a power input shaft, a power output shaft, a rotary variable capacity pump having a stationary stator and a rotor secured to and driven by said input shaft, a fixed capacity pump having less capacity than the maximum capacity of the variable capacity pump, said fixed capacity pump having a rotor driven by said input shaft and a stator connected to the output shaft whereby the capacity of said fixed capacity pump per unit of time is determined by the difference in rotation of the two shafts, ported means forming a connection from the discharge side of the variable capacity pump to the intake of the fixed capacity pump, a connection from the discharge of the fixed capacity pump to the intake of the variable capacity pump, means controlled by the speed of the output shaft for varying the capacity of the variable capacity pump from zero capacity to capacity equal to the capacity of the fixed capacity pump whereby the torque ratio of the output shaft may be controlled within ratios representing neutral and direct drive, means to reverse the action of said speed controlling means whereby the rotation and torque ratio of the output shaft will be reversed, and means for venting both interconnecting ports between the pumps at positions at both sides of neutral whereby creeping is avoided, said reverse means including means for controlling the capacity of the variable capacity pump between its maximum capacity and the capacity of the fixed capacity pump.

4. In a hydraulic transmission, a power input shaft, a power output shaft, a rotary variable capacity pump having a stationary stator and a rotor secured to and driven by said input shaft, a fixed capacity pump having less capacity than the maximum capacity of the variable capacity pump, said fixed capacity pump having a rotor driven by said input shaft and a stator connected to the output shaft whereby the capacity of said fixed capacity pump per revolution of the input shaft is controlled by the difference in rotation of the two shafts, ported means having a connection from the discharge side of the variable capacity pump and the intake of the fixed capacity pump, and a connection for connecting the discharge from the fixed capacity pump to the intake of the variable capacity pump, and means controlled by the speed of the output shaft for varying the capacity of the variable capacity pump from zero capacity to capacity equal to the capacity of the fixed capacity pump whereby the torque ratio of the output shaft may be controlled within ratios representing neutral and direct drive and means to reverse the action of said speed controlling means whereby the rotation and torque ratio of the output shaft will be reversed, said reverse means including means for controlling the capacity of the variable capacity pump between its maximum capacity and the capacity of the fixed capacity pump.

5. In a hydraulic transmission, a power input shaft, a power output shaft, a rotary variable capacity pump having a stationary stator and a rotor secured to and driven by said input shaft, a fixed capacity pump having less capacity than the maximum capacity of the variable capacity pump, said fixed capacity pump having a rotor driven by said input shaft and a stator connected to the output shaft whereby the capacity of said fixed capacity pump per unit of time is determined by the difference in rotation of the two shafts, ported means forming a connection from the discharge side of the variable capacity pump to the intake of the fixed capacity pump, a connection from the discharge of the fixed capacity pump to the intake of the variable capacity pump, means for varying the capacity of the variable capacity pump from zero capacity to capacity greater than the capacity of the fixed capacity pump whereby the torque ratio of the output shaft may be controlled within ratios representing neutral, direct drive, and reverse drive, and means for venting both interconnecting ports between the pumps at positions at both sides of neutral whereby creeping is avoided, said capacity varying means being operable to reverse the variable capacity pump to provide overdrive.

6. In a hydraulic transmission, a power input shaft, a power output shaft, a rotary variable capacity pump having a stationary stator and a rotor secured to and driven by said input shaft, a fixed capacity pump having less capacity than the maximum capacity of the variable capacity pump, said fixed capacity pump having a rotor driven by said input shaft and a stator connected to the output shaft whereby the capacity of said fixed capacity pump per revolution of the input shaft is determined by the difference in rotation of the two shafts, and ported means forming a connection from the discharge side of the variable capacity pump to the intake of the fixed capacity pump, a connection from the discharge of the fixed capacity pump to the intake of the variable capacity pump, and means controlled by the speed of the output shaft for varying the capacity of the variable capacity pump to modify the torque ratio between the shafts in forward and reverse, whereby either connection in the ported means may contain oil under pressure, and means for limiting the pressure in said ported means.

7. In a hydraulic transmission, a power input shaft, a power output shaft, a rotary pump having a stationary stator and a rotor secured to and driven by said input shaft, a second rotary pump of less capacity than said first mentioned pump, said second pump having a rotor driven by said input shaft and a stator connected to the output shaft, whereby the capacity of said second pump per revolution of the input shaft is determined by the difference in rotation of the two shafts, a ported control plate associated with said first mentioned pump, means controlled by the speed of the output shaft for adjusting said control plate to vary the capacity of said pump, ported means forming connections to the intake and discharge sides of said second pump, means carried by said control plate for interconnecting said connections with the intake and discharge sides of said first mentioned pump, a low pressure chamber, and means associated with said control plate for opening either or both of said connections to said low pressure chamber.

8. In a hydraulic transmission, a power input shaft, a power output shaft, a rotary pump having a stationary stator and a rotor secured to and driven by said input shaft, a second rotary pump of less capacity than said first mentioned pump, said second pump having a rotor driven by said input shaft and a stator connected to the output shaft, whereby the capacity of said second pump per revolution of the input shaft is determined by the difference in rotation of the two shafts, a ported control plate associated with said first mentioned pump, means for adjusting said control plate to vary the capacity of said pump, ported means forming connections to the intake and discharge sides of said second pump, means carried by said control plate for interconnecting said connections with the intake and discharge sides of said first mentioned pump, a low pressure chamber, and means associated with said control plate for opening either or both of said connections to said low pressure chamber.

9. In a hydraulic transmission, a power input shaft, a power output shaft, a rotary pump having a stationary pump element and a pump element secured to and driven by said input shaft, a second rotary pump of less capacity than said first mentioned pump, said second pump having a pump element driven by said input shaft and a pump element connected to the output shaft, whereby the capacity of said second pump per revolution of the input shaft is determined by the difference in rotation of the two shafts, a ported control plate associated with said first mentioned pump, means for adjusting said control plate to vary the capacity of said pump, ported means forming connections to the intake and discharge sides of said second pump, means carried by said control plate for interconnecting said connections with the intake and discharge sides of said first mentioned pump, a low pressure chamber, and means associated with said control plate for opening either or both of said connections to said low pressure chamber.

10. In a hydraulic transmission, a power input shaft, a power output shaft, a rotary pump having a fixed stator and having a rotor driven by the input shaft, a second pump having a stator secured to the power output shaft and a rotor driven by the power input shaft, a ported control plate associated with the first mentioned pump, means controlled by the speed of the output shaft for adjusting said ported control plate to vary the capacity of said pump, a stationary port housing having a plurality of ports, means associated with the control plate for connecting said ports to the intake and exhaust ports of the first mentioned pump, a rotatable port housing secured to the stator of the second mentioned pump and having ports connected to the intake and exhaust ports of said second mentioned pump, and means for interconnecting the ports in the stationary port housing and the rotatable port housing to provide a closed hydraulic circuit between the pumps.

11. In a hydraulic transmission, a power input shaft, a power output shaft, a rotary pump having a fixed stator and having a rotor driven by the input shaft, a second pump having a stator secured to the power output shaft and a rotor driven by the power input shaft, a ported control plate associated with the first mentioned pump, means for adjusting said ported control plate to vary the capacity of said pump, a stationary port housing having a plurality of ports, means associated with the control plate for connecting said ports to the intake and exhaust ports of the first mentioned pump, a rotatable port housing secured to the stator of the second mentioned pump and having ports connected to the intake and exhaust ports of said second mentioned pump, and means for interconnecting the ports in the stationary port housing and the rotatable port housing to provide a closed hydraulic circuit between the pumps.

12. In a hydraulic transmission, a power input shaft, a power output shaft, a rotary pump having a fixed stator and having a rotor driven by the input shaft, a second pump having a stator secured to the power output shaft and a rotor driven by the power input shaft, a ported control plate associated with the first mentioned pump, means for adjusting said ported control plate to vary the capacity of said pump, a stationary port housing having a plurality of ports, means associated with the control plate for connecting said ports to the intake and exhaust ports of the first mentioned pump, a rotatable port housing secured to the stator of the second mentioned pump and having ports connected to the intake and exhaust ports of said second mentioned pump, means for interconnecting the ports in the stationary port housing and the rotatable port housing to provide a closed hydraulic circuit between the pumps, a low pressure chamber, a port in the stationary port housing communicating with the low pressure chamber, and means for connecting either or both the supply circuit or return circuit to said low pressure port.

13. In a hydraulic transmission, a power input shaft, a power output shaft, a rotary pump having a fixed stator and having a rotor driven by the input shaft, a second pump having a stator secured to the power output shaft and a rotor driven by the power input shaft, a ported control plate associated with the first mentioned pump, means for adjusting said ported control plate to vary the capacity of said pump, a stationary port housing having a plurality of ports, means associated with the control plate for connecting said ports to the intake and exhaust ports of the first mentioned pump, a rotatable port housing secured to the stator of the second mentioned pump and having ports connected to the intake and exhaust ports of said second mentioned pump, means for interconnecting the ports in the stationary port housing and the rotatable port housing to provide a closed hydraulic circuit between the pumps, a low pressure chamber, a port in the stationary port housing communicating with the low pressure chamber, and means for connecting either the supply circuit or return circuit to said low pressure port, said means actuated in response to movement of the control plate to connect to said low pressure port the low pressure side of said hydraulic circuit whereby a uni-directional driving effect is obtained between the input and output shafts.

14. The combination defined in claim 13, including means for closing off said low pressure chamber to provide a bi-directional drive connection between said shafts.

15. The combination defined in claim 13, including means for hydraulically interconnecting said supply circuit and return circuit whereby the pressure is substantially equalized throughout the closed hydraulic circuit.

16. The combination defined in claim 13, wherein said first mentioned pump has a greater capacity than the second mentioned pump, the output shaft being stationary when the control plate is set to equalize the capacities of the pump.

17. The combination defined in claim 13, wherein said first mentioned pump has a greater capacity than the second mentioned pump, the output shaft being stationary when the control plate is set to equalize the capacities of the pumps, such setting of the control plate comprising a neutral position, and means for interconnecting the supply circuit and return circuit when the control plate is at the neutral position or close to the neutral position, whereby creeping is avoided.

18. In a hydraulic transmission, a power input shaft, a power output shaft, a rotary pump having a fixed stator and having a rotor driven by the input shaft, a second pump having a stator secured to the power output shaft and a rotor driven by the power input shaft, a ported control plate associated with the first mentioned pump, means for adjusting said ported control plate to vary the capacity of said pump, a stationary port housing having a plurality of ports, means associated with the control plate for connecting said ports to the intake and exhaust ports of the first mentioned pump, a rotatable port housing secured to the stator of the second mentioned pump and having ports connected to the intake and exhaust ports of said second mentioned pump, means for interconnecting the ports in the stationary port housing and the rotatable port housing to provide a closed hydraulic circuit between the pumps including a supply circuit and a return circuit, either said supply circuit or return circuit adapted to contain oil under relatively high pressure, as determined by the adjustment of said control plate, and means for limiting said pressure.

19. The combination defined in claim 18, wherein said transmission is housed in a closed oil filled casing, and wherein the limiting means includes a pressure relief valve discharging into the casing.

20. The combination defined in claim 18, wherein said transmission is housed in a closed oil filled casing, wherein the limiting means includes a pressure relief valve discharging into the casing, and means for continuously changing the oil in the casing whereby heat generated by passing oil under pressure through said relief valve is dissipated.

21. In a hydraulic transmission, a power input shaft, a power output shaft, a rotary vane pump including a vaned rotor secured to the input shaft, a stationary stator, a second rotary vane pump having a vaned rotor secured to the input shaft and a stator secured to the output shaft, a closed hydraulic circuit between the pumps, and hydraulic means for maintaining the vanes of said rotors in contact with the stators, said means including an automatically operated mechanism to maintain said vanes in hydraulic communication with a high pressure portion of said hydraulic means.

22. In a hydraulic transmission, a power input shaft, a power output shaft, a rotary vane pump including a vaned rotor secured to the input shaft, a stationary stator, a second rotary vane pump having a vaned rotor secured to the input shaft and a stator secured to the output shaft, a closed hydraulic circuit between the pumps, hydraulic means for maintaining the vanes of said rotors in contact with the stators, said means including an automatically controlled connection to maintain the vanes of one pump in hydraulic communication with the high pressure portion of the hydraulic circuit, and means including a longitudinal opening in the power input shaft for connecting the vanes of the second pump hydraulically with the vanes of the first pump.

23. In a hydraulic transmission, a power input shaft, a power output shaft, a pump having a fixed stator and a rotor connected to the input shaft, a second pump having a rotor secured to the input shaft, and a stator secured to the output shaft, a control plate provided with an intake and exhaust port for the first mentioned pump adjustable to vary the capacity of said first mentioned pump, means between the pumps for interconnecting them to form a closed hydraulic circuit including a port forming a supply circuit to the second mentioned pump and a port forming a return circuit from the second mentioned pump, said supply port communicating through said control plate with the exhaust port of the first mentioned pump, and said return port communicating through the control plate with the intake port of the first mentioned pump, a low pressure chamber, a port disposed between the supply port and return port and communicating with the low pressure chamber, and communicating through the control plate with either the supply port or return port or with both the supply and return ports.

24. In a hydraulic transmission, a power input shaft, a power output shaft, a pump having a fixed stator and a rotor connected to the input shaft, a second pump having a rotor secured to the input shaft, and a stator secured to the output shaft, a control plate provided with an intake and exhaust port for the first mentioned pump adjustable to vary the capacity of said first mentioned pump, means between the pumps for interconnecting them to form a closed hydraulic circuit including a port forming a supply circuit to the second mentioned pump and a port forming a return circuit from the second mentioned pump, said supply port communicating through said control plate with the exhaust port of the first mentioned pump, and said return port communicating through the control plate with the intake port of the first mentioned pump, a low pressure chamber, a port disposed between the supply port and return port and communicating with the low pressure chamber, and communicating through the control plate with either the supply port or return port or with both the supply and return ports, said ports arranged so that when the capacity of the first mentioned pump is equal to the capacity of the second mentioned pump, the supply and return ports are hydraulically interconnected through said low pressure chamber.

25. In a hydraulic transmission, a power input shaft, a power output shaft, a pump having a fixed stator and a rotor connected to the input shaft, a second pump having a rotor secured to the input shaft, and a stator secured to the output shaft, a control plate provided with an intake and exhaust port for the first mentioned pump adjustable to vary the capacity of said first mentioned pump, means between the pumps for interconnecting them to form a closed hydraulic circuit including a port forming a supply circuit to the second mentioned pump and a port forming a return circuit from the second mentioned pump, said supply port communicating through said control plate with the exhaust port of the first mentioned pump, and said return port communicating through the control plate with the intake port of the first mentioned pump, a low pressure chamber, a port disposed between the supply port and return port and communicating with the low pressure chamber, and communicating through the control plate with either the supply port or return port or with both the supply and return ports, said ports arranged so that when the capacity of the first mentioned pump is less than the capacity of the second mentioned pump, said supply port only is in communication with the low pressure chamber.

26. In a hydraulic transmission, a power input shaft, a power output shaft, a pump having a fixed stator and a rotor connected to the input shaft, a second pump having a rotor secured to the input shaft, and a stator secured to the output shaft, a control plate provided with an intake and exhaust port for the first mentioned pump adjustable to vary the capacity of said first mentioned pump, means between the pumps for interconnecting them to form a closed hydraulic circuit including a port forming a supply circuit to the second mentioned pump and a port forming a return circuit from the second mentioned pump, said supply port communicating through said control plate with the exhaust port of the first mentioned pump, and said return port communicating through the control plate with the intake port of the first mentioned pump, a low pressure chamber, a port disposed between the supply port and return port and communicating with the low pressure chamber, and communicating through the control plate with either the supply port or return port or with both the supply and return ports, said ports being so arranged that when the first mentioned pump has a greater capacity than the second mentioned pump, the return port only is in communication with the low pressure chamber.

27. In a hydraulic transmission, a power input shaft, a power output shaft, a pump having a fixed stator and a rotor connected to the input shaft, a second pump having a rotor secured to the input shaft, and a stator secured to the output shaft, a control plate provided with an intake and exhaust port for the first mentioned pump adjustable to vary the capacity of said first mentioned pump, means between the pumps for interconnecting them to form a closed hydraulic circuit including a port forming a supply circuit to the second mentioned pump and a port forming a return circuit from the second mentioned pump, said supply port communicating through said control plate with the exhaust port of the first mentioned pump, and said return port communicating through the control plate with the intake port of the first mentioned pump, a low pressure chamber, a port disposed between the supply port and return port and communicating with the low pressure chamber, and communicating through the control plate with either the supply port or return port or with both the supply and return ports, and means for permitting the pressure in the low pressure chamber to be raised for the purpose described.

28. A hydraulic transmission, including a casing, an input shaft journaled in the casing, an output shaft journaled in the casing, a multiple rotary type vane pump having a rotor secured to the input shaft and a stator secured to the casing, a multiple rotary type vane pump having a rotor secured to the input shaft and a stator secured to the output shaft, a ported control plate having a plurality of intake and exhaust ports communicating with the first mentioned pump, a stationary port housing having a plurality of ports communicating with the intake and exhaust ports in said control plate, a rotatable port housing secured to the stator of the second mentioned pump and having a plurality of intake and exhaust ports communicating with the second mentioned pump, and means for interconnecting the ports of the stationary port housing and rotatable port housing to form a closed hydraulic circuit between the pumps, including a supply circuit to the second mentioned pump and a return circuit from the second mentioned pump.

29. The combination defined in claim 28, including means controlled by the speed of the output shaft for adjusting said control plate to vary the capacity of the first mentioned pump.

30. The combination defined in claim 28, including means for adjusting said control plate to vary the capacity of the first mentioned pump.

31. The combination defined in claim 28, wherein said first mentioned pump has a greater maximum capacity than the second mentioned pump, and means for adjusting the control plate to vary the capacity of the first mentioned pump, whereby said output shaft may be held stationary or driven in a forward or reverse direction.

32. The combination defined in claim 28, including means for adjusting the control plate to vary the capacity thereof or to reverse the ports therein.

33. The combination defined in claim 28, wherein said casing is filled with oil under substantially atmospheric pressure, and means communicating the hydraulic circuit with the casing to control the pressure in said circuit.

34. In a hydraulic transmission, a stationary casing, a power input shaft projecting into the casing, a power output shaft projecting into the casing, rotary hydraulic pump means for transmitting movement from the power input shaft to the power output shaft within the casing, said casing being entirely filled with oil and shaped so that a centrifugal propelling action of the oil is caused by the rotary pump, a separate oil tank, means for utilizing said propelling action for delivering oil from the casing to said tank, and means for delivering oil from said tank back to said casing.

35. In a hydraulic transmission for an automobile, a power input shaft, a power output shaft, hydraulic means for coupling said shafts to drive said output shaft in forward or reverse direction in a full range of speed ratios, means actuated by the speed of the output shaft for controlling the speed ratios between said shafts, wherein said control means includes centrifugal devices carried by the output shaft, an adjustable control element and a connection for actuating said control element by the movement of said centrifugal devices, an engine foot throttle, said control element having a connection to said engine foot throttle, and being initially actuated as an incident to depressing the foot throttle to couple said shafts hydraulically whereby the centrifugal devices are thereby rendered effective.

36. In a hydraulic transmission for an automobile, a power input shaft, a power output shaft, hydraulic means for coupling said shafts to drive said output shaft in forward or reverse direction in a full range of speed ratios, means actuated by the speed of the output shaft for controlling the speed ratios between said shafts, wherein said control means includes centrifugal devices carried by the output shaft, an adjustable control element movable to couple the shafts hydraulically for forward or reverse drive, a connection from the centrifugal devices to said control element, whereby energization of said centrifugal devices normally moves said control element to cause forward drive, and means for causing said centrifugal devices to move the control element to cause a reverse drive.

37. In a hydraulic transmission, a power input shaft, a power output shaft, a rotary variable capacity pump having a stationary stator and a rotor secured to and driven by said input shaft, a fixed capacity pump having less capacity than the maximum capacity of the variable capacity pump, said fixed capacity pump having a rotor driven by said input shaft and a stator connected to the output shaft whereby the capacity of said pump per unit of time is determined by the difference in rotation of the two shafts, ported means forming a connection from the discharge side of the variable capacity pump to the intake of the fixed capacity pump, a connection from the discharge of the fixed capacity pump to the intake of the variable capacity pump, whereby one of said connections in the ported means is adapted to contain oil under relatively high pressure and the other of said connections is adapted to contain oil under relatively low pressure, a separate tank, means for venting the low pressure connection to said tank to permit the output shaft to overrrun the input shaft beyond the intended ratio, means for delivering oil from said tank back to said low pressure connection, and a valve forming a part of said venting means and means for closing said valve to prevent the output shaft from overrunning the input shaft.

38. In a hydraulic transmission, a power input shaft, a power output shaft, a rotary variable capacity pump having a stationary stator and a rotor secured to and driven by said input shaft, a fixed capacity pump having less capacity than the maximum capacity of the variable capacity pump, said fixed capacity pump having a rotor driven by said input shaft and a stator connected to the output shaft whereby the capacity of said pump per unit of time is determined by the difference in rotation of the two shafts, ported means forming a connection from the discharge side of the variable capacity pump to the intake of the fixed capacity pump, a connection from the discharge of the fixed capacity pump to the intake of the variable capacity pump, whereby one of said connections in the ported means is adapted to contain oil under relatively high pressure and the other of said connections is adapted to contain oil under relatively low pressure, a separate tank, means for venting the low pressure connection to said tank to permit the output shaft to overrun the input shaft beyond the intended ratio, means for delivering oil from said tank back to said low pressure connection, with said venting means including a valve, a connection from the valve to the usual brake pedal, and means for closing said valve as an incident to the operation of said brake pedal to prevent the output shaft from overrunning the input shaft during the application of the brake, and whereby the motor always acts as a brake during the operation of the brake pedal.

39. In a hydraulic transmission, a power input shaft, a power output shaft, a rotary variable capacity pump having a stationary stator and a rotor secured to and driven by said input shaft, a fixed capacity pump having less capacity than the maximum capacity of the variable capacity pump, said fixed capacity pump having a rotor driven by said input shaft and a stator connected to the output shaft whereby the capacity of said pump per unit of time is determined by the difference in rotation of the two shafts, ported means forming a connection from the discharge side of the variable capacity pump to the intake of the fixed capacity pump, a connection from the discharge of the fixed capacity pump to the intake of the variable capacity pump, whereby one of said connections in the ported means is adapted to contain oil under relatively high pressure and the other of said connections is adapted to contain oil under relatively low pressure, a separate tank, means for venting the low pressure connection to said tank to permit the output shaft to overrun the input shaft beyond the intended ratio, means for delivering oil from said tank back to said low pressure connection, with said venting means including a pair of valves, manual means for operating one valve, and a connection from the second valve to the usual brake pedal whereby said valve is closed as an incident to the operation of said brake pedal.

40. In a hydraulic transmission, a power input shaft, a power output shaft, a rotary variable capacity pump having a stationary stator and a rotor secured to and driven by said input shaft, a fixed capacity pump having less capacity than the maximum capacity of the variable capacity pump, said fixed capacity pump having a rotor driven by said input shaft and a stator connected to the output shaft whereby the capacity of said pump per unit of time is determined by the difference in rotation of the two shafts, ported means forming a connection from the discharge side of the variable capacity pump to the intake of the fixed capacity pump, a connection from the discharge of the fixed capacity pump to the intake of the variable capacity pump, whereby one of said connections in the ported means is adapted to contain oil under relatively high pressure and the other of said connections is adapted to contain oil under relatively low pressure, and means including a valve for venting the low pressure connection to atmosphere to prevent building up a pressure in said low pressure connection and to permit the output shaft to overrun the input shaft beyond the intended ratio, and means for closing said valve to prevent the output shaft from overrunning the input shaft.

41. The combination defined in claim 40, wherein said valve has a connection to the usual brake pedal whereby it is closed as an incident to the operation of the brake pedal.

42. In a hydraulic transmission, a power input shaft, a power output shaft, a pump having a stationary pump element and a pump element connection to the input shaft, a second pump having a pump element secured to the input shaft and a pump element secured to the output shaft, control means provided with an intake and exhaust port for the first mentioned pump, means between the pumps for interconnecting them to form a closed hydraulic circuit, said interconnecting means communicating through said control means with the intake and exhaust ports of the first mentioned pump, a low pressure chamber, the port in said interconnecting means in communication with said low pressure chamber, and means forming a part of said control means for connecting either the intake or exhaust ports or both with the port leading to said low pressure chamber.

43. In a hydraulic transmission, a power input shaft, a power output shaft, a pump having a stationary pump element and a pump element connection to the input shaft, a second pump having a pump element secured to the input shaft and a pump element secured to the output shaft, control means provided with an intake and exhaust port for the first mentioned pump, means between the pumps for interconnecting them to form a closed hydraulic circuit, said interconnecting means communicating through said control means with the intake and exhaust ports of the first mentioned pump, a low pressure chamber, a port in said interconnecting means in communication with said low pressure chamber, means forming a part of said control means for connecting either the intake or exhaust ports or both with the port leading to said low pressure chamber, and means for closing the outlet from said low pressure chamber to cause development of a high pressure in said low pressure chamber.

CLIFFORD E. IVES.